(12) United States Patent
Kudo et al.

(10) Patent No.: US 7,721,295 B2
(45) Date of Patent: May 18, 2010

(54) EXECUTION MULTIPLICITY CONTROL SYSTEM, AND METHOD AND PROGRAM FOR CONTROLLING THE SAME

(75) Inventors: Yutaka Kudo, Yokohama (JP); Futoshi Haga, Sagamihara (JP); Norihiro Kobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1478 days.

(21) Appl. No.: 11/034,438

(22) Filed: Jan. 11, 2005

(65) Prior Publication Data
US 2005/0172303 A1    Aug. 4, 2005

(30) Foreign Application Priority Data
Jan. 19, 2004   (JP)   ............... 2004-011106

(51) Int. Cl.
*G06F 9/54* (2006.01)
*G06F 17/60* (2006.01)
(52) U.S. Cl. ................................. 719/316; 705/17
(58) Field of Classification Search ................ 719/316; 709/203
See application file for complete search history.

(56) References Cited

U.S. PATENT DOCUMENTS

| | | | | |
|---|---|---|---|---|
| 6,393,458 | B1 * | 5/2002 | Gigliotti et al. | 709/203 |
| 6,779,017 | B1 * | 8/2004 | Lamberton et al. | 709/203 |
| 2003/0195962 | A1 * | 10/2003 | Kikuchi et al. | 709/226 |
| 2004/0143659 | A1 * | 7/2004 | Milliken et al. | 709/224 |

FOREIGN PATENT DOCUMENTS

| | | |
|---|---|---|
| JP | 05-143559 | 6/1993 |
| JP | 07-093238 | 4/1995 |
| JP | 2000-172654 | 6/2000 |
| JP | 2001-092766 | 4/2001 |
| JP | 2001-175460 | 6/2001 |
| JP | 2002-091936 | 3/2002 |
| JP | 2003-178040 A | 6/2003 |

OTHER PUBLICATIONS

Japan Patent Office (JPO) office action for JPO patent application JP2004-011106 (Jul. 23, 2008).

* cited by examiner

*Primary Examiner*—Hyung S Sough
*Assistant Examiner*—Abdou K Seye
(74) *Attorney, Agent, or Firm*—Townsend and Townsend and Crew LLP

(57) ABSTRACT

An execution multiplicity control system is provided which measures a load distribution over service objects for each case when one type of service requests are inputted into a distributed object system; calculates an effect index for when the execution multiplicity of each of the service objects is varied, based on the load distribution; measures, for each type of the service requests, the number of service requests actually inputted, to acquire a request distribution; calculates and stores a total effect index for when the execution multiplicity of each of the service objects is varied, based on the effect index and the request distribution; and controls the execution multiplicity of the service objects by applying a method of controlling the execution multiplicity of the service objects in descending order of the respective total effect indices calculated.

18 Claims, 18 Drawing Sheets

EFFECT INDEX TABLE 116 (2)

| | SYSTEM ID (401) | REQUEST NAME (402) | SERVICE NAME (403) | ADDITION EFFECT INEX (404) | DELETION EFFECT INDEX (405) |
|---|---|---|---|---|---|
| 1611 | SYS_001 | REQ_001 | WEB_001 | 6.7 (3→4) | -13.3 (3→2) |
| 1612 | SYS_001 | REQ_001 | AP_001 | 10 (1→2) | - (1→0) |
| 1613 | SYS_001 | REQ_001 | DB_001 | 0 (1→2) | - (1→0) |
| 1614 | SYS_001 | REQ_002 | WEB_001 | 3.3 (3→4) | -6.7 (3→2) |
| 1615 | SYS_001 | REQ_002 | AP_001 | 20 (1→2) | - (1→0) |
| 1616 | SYS_001 | REQ_002 | DB_001 | 10 (1→2) | - (1→0) |
| 1617 | SYS_001 | REQ_003 | WEB_001 | 0.8 (3→4) | -1.7 (3→2) |
| 1618 | SYS_001 | REQ_003 | AP_001 | 15 (1→2) | - (1→0) |
| 1619 | SYS_001 | REQ_003 | DB_001 | 30 (1→2) | - (1→0) |
| | ... | ... | ... | ... | ... |

LOAD DISTRIBUTION ACCUMULATING TABLE 112

| | 201 | 202 | 203 | 204 | 205 |
|---|---|---|---|---|---|
| | SYSTEM ID | MEASUREMENT ID | SERVICE NAME | MACHINE ID | LOAD RATE [%] |
| 211 | SYS_001 | 1 | WEB_001 | M001 | 80 |
| | SYS_001 | 1 | AP_001 | M002 | 20 |
| | SYS_001 | 1 | DB_001 | M003 | 0 |
| 212 | SYS_001 | 2 | WEB_001 | M001 | 40 |
| | SYS_001 | 2 | AP_001 | M002 | 40 |
| | SYS_001 | 2 | DB_001 | M003 | 20 |
| 213 | SYS_001 | 3 | WEB_001 | M001 | 10 |
| | SYS_001 | 3 | AP_001 | M002 | 30 |
| | SYS_001 | 3 | DB_001 | M003 | 60 |
| | ... | ... | ... | ... | ... |
| 214 | SYS_001 | 101 | WEB_001 | M001 | 22 |
| | SYS_001 | 101 | WEB_001 | M001 | 25 |
| | SYS_001 | 101 | WEB_001 | M001 | 26 |
| | SYS_001 | 101 | AP_001 | M002 | 20 |
| | SYS_001 | 101 | DB_001 | M003 | 10 |
| | ... | ... | ... | ... | ... |
| 215 | SYS_001 | 122 | WEB_001 | M001 | 61 |
| | SYS_001 | 122 | AP_001 | M002 | 27 |
| | SYS_001 | 122 | DB_001 | M003 | 12 |
| | ... | ... | ... | ... | ... |
| 216 | SYS_001 | 134 | WEB_001 | M001 | 30 |
| | SYS_001 | 134 | WEB_001 | M002 | 31 |
| | SYS_001 | 134 | AP_001 | M004 | 28 |
| | SYS_001 | 134 | DB_001 | M003 | 11 |
| | ... | ... | ... | ... | ... |

Fig. 2

REQUEST DISTRIBUTION ACCUMULATING TABLE 114

| | 301 | 302 | 303 | 304 |
|---|---|---|---|---|
| | SYSTEM ID | MEASUREMENT ID | REQUEST NAME | REQUEST RATE [%] |
| 311 | SYS_001 | 1 | REQ_001 | 100 |
| | SYS_001 | 1 | REQ_002 | 0 |
| | SYS_001 | 1 | REQ_003 | 0 |
| 312 | SYS_001 | 2 | REQ_001 | 0 |
| | SYS_001 | 2 | REQ_002 | 100 |
| | SYS_001 | 2 | REQ_003 | 0 |
| 313 | SYS_001 | 3 | REQ_001 | 0 |
| | SYS_001 | 3 | REQ_002 | 0 |
| | SYS_001 | 3 | REQ_003 | 100 |
| | ... | ... | ... | ... |
| 314 | SYS_001 | 101 | REQ_001 | 60 |
| | SYS_001 | 101 | REQ_002 | 30 |
| | SYS_001 | 101 | REQ_003 | 10 |
| | ... | ... | ... | ... |
| 315 | SYS_001 | 122 | REQ_001 | 40 |
| | SYS_001 | 122 | REQ_002 | 21 |
| | SYS_001 | 122 | REQ_003 | 39 |
| | ... | ... | ... | ... |
| 316 | SYS_001 | 134 | REQ_001 | 42 |
| | SYS_001 | 134 | REQ_002 | 19 |
| | SYS_001 | 134 | REQ_003 | 39 |
| | ... | ... | ... | ... |

Fig. 3

EFFECT INDEX TABLE 116

| | 401 | 402 | 403 | 404 | 405 |
|---|---|---|---|---|---|
| | SYSTEM ID | SERVICE REQUEST NAME | SERVICE NAME | ADDITION EFFECT INDEX | DELETION EFFECT INDEX |
| 411 | SYS_001 | REQ_001 | WEB_001 | 40 | - |
| 412 | SYS_001 | REQ_001 | AP_001 | 10 | - |
| 413 | SYS_001 | REQ_001 | DB_001 | 0 | - |
| 414 | SYS_001 | REQ_002 | WEB_001 | 20 | - |
| 415 | SYS_001 | REQ_002 | AP_001 | 20 | - |
| 416 | SYS_001 | REQ_002 | DB_001 | 10 | - |
| 417 | SYS_001 | REQ_003 | WEB_001 | 5 | - |
| 418 | SYS_001 | REQ_003 | AP_001 | 15 | - |
| 419 | SYS_001 | REQ_003 | DB_001 | 30 | - |
| | ... | ... | ... | ... | ... |
| 421 | SYS_002 | REQ_001 | WEB_021 | 20 | -10 |
| | ... | ... | ... | ... | ... |

Fig. 4

QUOTA TABLE 118

| SYSTEM ID | MAXIMUM NUMBER OF MACHINES | NUMBER OF MACHINES CURRENTLY USED |
|---|---|---|
| SYS_001 | 5 | 3 |
| SYS_002 | 3 | 3 |
| SYS_003 | 3 | 3 |
| SYS_004 | 5 | 3 |
| SYS_005 | 2 | 1 |
| SYS_006 | 4 | 3 |
| SYS_007 | 10 | 9 |
| SYS_008 | 3 | 3 |
| ... | ... | ... |

Fig. 5

RESOURCE MANAGEMENT TABLE 120

| MACHINE ID | SYSTEM NAME |
|---|---|
| M_001 | SYS_001 |
| M_002 | SYS_001 |
| M_003 | SYS_001 |
| M_004 | |
| M_005 | |
| M_006 | |
| M_007 | |
| M_008 | |
| | |

Fig. 6

PROGRAM REPOSITORY 122

TEMPORARY TABLE 1200

| | SERVICE NAME (1201) | REQUEST NAME (1202) | ADDITION EFFECT INDEX (1203) | DELETION EFFECT INDEX (1204) |
|---|---|---|---|---|
| 1211 | WEB_001 | REQ_001 | 4.0 | -8.0 |
| 1212 | WEB_001 | REQ_002 | 1.0 | -2.0 |
| 1213 | WEB_001 | REQ_003 | 0.1 | -0.2 |
| 1214 | AP_001 | REQ_001 | 6.0 | - |
| 1215 | AP_001 | REQ_002 | 6.0 | - |
| 1216 | AP_001 | REQ_003 | 1.5 | - |
| 1217 | DB_001 | REQ_001 | 0.0 | - |
| 1218 | DB_001 | REQ_002 | 3.0 | - |
| 1219 | DB_001 | REQ_003 | 3.0 | - |
| 1220 | WEB_001 | TOTAL | 5.1 | -10.2 |
| 1221 | AP_001 | TOTAL | 13.5 | - |
| 1222 | DB_001 | TOTAL | 6.0 | - |

Fig. 12

PROGRAM DELIVERY/SETTING SCRIPT 1401

```
# DELIVERY RE-SETTING SCRIPT
# SYSTE_001
# 2003/9/14, 23:57:00

1411  Delete( "M_004", "SYS_001", "WEB_001");
1412  Reconfig( "LB_001", "DELETE", "M_004", "WEB_001");
1413  Add( "M_004", "SYS_001", "DB_001");
1415  Reconfig( "NS_001", "ADD", "M_004", "DB_001");
```

Fig. 14

PROCESSING OF PROGRAM DELIVERY/SETTING DEVICE 1173

EFFECT INDEX TABLE 116 (2)

| | SYSTEM ID (401) | REQUEST NAME (402) | SERVICE NAME (403) | ADDITION EFFECT INEX (404) | DELETION EFFECT INDEX (405) |
|---|---|---|---|---|---|
| 1611 | SYS_001 | REQ_001 | WEB_001 | 6.7 (3→4) | -13.3 (3→2) |
| 1612 | SYS_001 | REQ_001 | AP_001 | 10 (1→2) | - (1→0) |
| 1613 | SYS_001 | REQ_001 | DB_001 | 0 (1→2) | - (1→0) |
| 1614 | SYS_001 | REQ_002 | WEB_001 | 3.3 (3→4) | -6.7 (3→2) |
| 1615 | SYS_001 | REQ_002 | AP_001 | 20 (1→2) | - (1→0) |
| 1616 | SYS_001 | REQ_002 | DB_001 | 10 (1→2) | - (1→0) |
| 1617 | SYS_001 | REQ_003 | WEB_001 | 0.8 (3→4) | -1.7 (3→2) |
| 1618 | SYS_001 | REQ_003 | AP_001 | 15 (1→2) | - (1→0) |
| 1619 | SYS_001 | REQ_003 | DB_001 | 30 (1→2) | - (1→0) |
| | ... | ... | ... | ... | ... |

Fig. 16

REQUEST DISTRIBUTION PREDICTING TABLE 1801

| | SYSTEM ID 1811 | REQUEST NAME 1812 | TIME PERIOD 1813 | NUMBER OF REQUESTS 1814 |
|---|---|---|---|---|
| 1821 | SYS_001 | REQ_001 | 08:00-09:00 | 1023 |
| 1822 | SYS_001 | REQ_001 | 09:00-10:00 | 545 |
| 1823 | SYS_001 | REQ_001 | 10:00-11:00 | 20 |
| | ... | ... | ... | ... |
| 1831 | SYS_001 | REQ_002 | 08:00-09:00 | 820 |
| 1832 | SYS_001 | REQ_002 | 09:00-10:00 | 322 |
| 1833 | SYS_001 | REQ_002 | 10:00-11:00 | 32 |
| | ... | ... | ... | ... |
| 1841 | SYS_001 | REQ_003 | 08:00-09:00 | 40 |
| 1842 | SYS_001 | REQ_003 | 09:00-10:00 | 11 |
| 1843 | SYS_001 | REQ_003 | 10:00-11:00 | 34 |
| | ... | ... | ... | ... |

Fig. 18

EXECUTION MULTIPLICITY CONTROL SYSTEM, AND METHOD AND PROGRAM FOR CONTROLLING THE SAME

CROSS-REFERENCE TO RELATED APPLICATIONS

The present application claims priority upon Japanese Patent Application No. 2004-11106 filed on Jan. 19, 2004, which is herein incorporated by reference.

BACKGROUND OF THE INVENTION

1. Field of the Invention

The present invention relates to an execution multiplicity control system dynamically controlling the execution multiplicity of a plurality of service objects in a distributed object system implemented by the objects.

2. Description of the Related Art

In recent years, systems utilizing networks such as the Internet and intranets have rapidly prevailed. With this prevalence, the load on the information processing apparatuses constituting these systems has become increased. Thus, in centers such as system centers and data centers of companies, improvement of the service response speed by distributing the load to a plurality of resources is demanded. Furthermore, mechanisms are demanded that realize optimization of the load balance at the low-cost and within limited hardware resources and software resources while improving the efficiency of use of the resources.

As a technique for executing such load distribution, for example, in the Japanese Patent Application Laid-open Publication No. 07-93238, a technique is disclosed, in which objects executing a same process are arranged in a plurality of server machines and processing requests from clients are distributed to the objects. In the technique described in the Japanese Patent Application Laid-open Publication No. 07-93238, a metric string is transmitted to each of the server machines and the responses to the string are analyzed when a service request from a client is processed. Thereby, the load status of the server machines is measured and the server machine with the lowest load is determined. Thereby, a server for processing the service request from the client is dynamically determined and the service request is transferred to the server machine having been determined for processing.

In the Japanese Patent Application Laid-open Publication No. 2000-172654, a technique is disclosed, in which a service object is duplicated into a server machine with low load and a processing request from a client is transferred to the duplicated service object. In the technique described in the Japanese Patent Application Laid-open Publication No. 2000-172654, it is not that a plurality of objects offering a same service are arranged in advance, but a duplicate of a server object is dynamically produced during the operation of a server program and the duplicated object is transferred to another computer having a low CPU utilization and is caused to run on the computer. Then, for a remote method invocation from the client computer, the duplicated object is made to perform remote method invocation.

By the way, among the recent systems, a system (hereinafter, referred to as "distributed object system") has a configuration in which a plurality of service objects are sequentially invoked where, for example, a service object invoked directly by a client apparatus invokes another service object during its process.

Here, in order to realize load distribution in a distributed object system, it can be considered to configure so as to simply increase the execution multiplicity of the service object, for example, when the load on a service object invoked directly from a client is increased. However, in this case, when factors for load increase of a first service object exist in another service object executed subsequent thereto, load balancing effect corresponding to the resource consumption cannot be expected. Furthermore, specific service objects consume the resources intensively. Thereby the load balance of the whole system cannot be maintained.

As another method for realizing load balancing in a distributed object system, a method can be considered, in which a series of other service objects than a service object invoked directly by a client, that are executed following the service object invoked by the client, are multiplexed together. However, in this case, service objects that do not need to be multiplexed would be multiplexed and resources may be consumed wastefully in the case of this method as well.

Furthermore, as another method for realizing the load balancing, a method can be considered, in which load is measured for each of the combinations of adjacent service objects in a series of service objects and load distribution is carried out respectively for each of the combinations. However, when the amount of resources for multiplexing is limited, multiplexing may not be executed for the portion that essentially needs to be multiplexed in this method.

SUMMARY OF THE INVENTION

It is therefore an object of the present invention to provide an execution multiplicity control system that can appropriately realize load balancing without consuming resources wastefully, while maintaining the load balance for the entire system in a distributed object system that is implemented to include a plurality of service objects.

In order to achieve the above object, according to an aspect of the present invention there is provided an execution multiplicity control system dynamically controlling execution multiplicity of a plurality of service objects in a distributed object system including the service objects that are objects implemented by execution of a program by a CPU, the execution multiplicity control system comprising at least one computer; a load information acquisition unit, implemented by execution of a program by the computer, that measures a load on each of the service objects forming the distributed object system for each case when one type of service requests are inputted into the distributed object system, and, based on the measured loads, acquires and stores a load distribution over the service objects forming the distributed object system; an effect index calculation unit that calculates and stores an effect index which is an index indicating an improvement effect of the processing efficiency of the distributed object system for when the execution multiplicity of each of the service objects is varied, based on the load distribution; a request information acquisition unit that measures, for each type of the service requests, the number of service requests inputted into the distributed object system, acquires a request distribution that is a distribution of the numbers of the service requests based on the measured number of the service requests, and stores the acquired request distribution; a total effect index calculation unit that calculates and stores a total effect index which is an index indicating an improvement effect of the processing efficiency of the distributed object system for when the execution multiplicity of each of the service objects is varied, based on the effect index and the request distribution; and an execution multiplicity control unit that controls the execution multiplicity of the service objects in the distributed object system by applying a method of controlling the execution multiplicity of the service objects in descending order of the respective total effect indices calculated.

According to another aspect of the present invention there is provided an execution multiplicity control system dynamically controlling execution multiplicity of a plurality of service objects in a distributed object system including the service objects that are objects implemented by execution of a program by a CPU, the execution multiplicity control system comprising at least one computer; a load information acquisition unit, implemented by execution of a program by the computer, that measures a load on each of the service objects forming the distributed object system, acquires a load distribution of the service objects forming the distributed object system based on the measured loads, and stores the acquired load distribution accumulatively; a request information acquisition unit that measures, for each type of service requests, the number of service requests inputted into the distributed object system, acquires a request distribution that is a distribution of the numbers of the service requests based on the measured numbers of the service requests and stores the acquired request distribution accumulatively so as to be associated with the execution state of the service objects in the measurement; a difference acquisition unit that extracts a request distribution similar to a most recently acquired request distribution from the request distributions stored in the request information acquisition unit and acquires differences in control states of execution multiplicity and load distribution of the service objects between at a time specified by the execution state stored associated with the extracted request distribution and at the most recent time; a total effect index calculation unit that calculates and stores a total effect index that is an index indicating an improvement effect of the processing efficiency of the distributed object system for when the execution multiplicity of each of the service objects is varied, based on the difference in the control state of the execution multiplicity of the service object and the difference in the load distribution; and an execution multiplicity control unit that controls the execution multiplicity of the service objects in the distributed object system by applying a method of controlling the execution multiplicity of the service objects in descending order of the respective total effect indices calculated.

According to an execution multiplicity control system of the present invention, an optimum load distribution can be realized within the limited quantity of resources while maintaining the load balance for the entire system in a distributed object system implemented to include a plurality of service objects.

BRIEF DESCRIPTION OF THE DRAWINGS

The above and other objects, aspects, features and advantages of the present invention will become more apparent from the following detailed description when taken in conjunction with the accompanying drawings, in which:

FIG. 2 shows an example of a load distribution accumulation table 112 to be described in the embodiment of the present invention;

FIG. 3 shows an example of a request distribution accumulation table 114 to be described in the embodiment of the present invention;

FIG. 4 shows an example of an effect index table 116 to be described in the embodiment of the present invention;

FIG. 5 shows an example of a quota table 118 to be described in the embodiment of the present invention;

FIG. 6 shows an example of a resource management table 120 to be described in the embodiment of the present invention;

FIG. 12 shows an example of a temporary table 1200 created on a memory temporarily by the configuration determining device 1171 to be described in the embodiment of the present invention;

FIG. 14 shows an example of a program delivery/setting script 1401 created by the resource assigning unit 1172 to be described in the embodiment of the present invention;

FIG. 16 shows an example of the effect index table 116 to be described in the embodiment of the present invention;

FIG. 18 shows an example of a request distribution predicting table 1801 to be described in an embodiment of the present invention.

DETAILED DESCRIPTION OF THE INVENTION

Several embodiments of the present invention will now be described in detail.

Embodiment 1

Figure 1A:
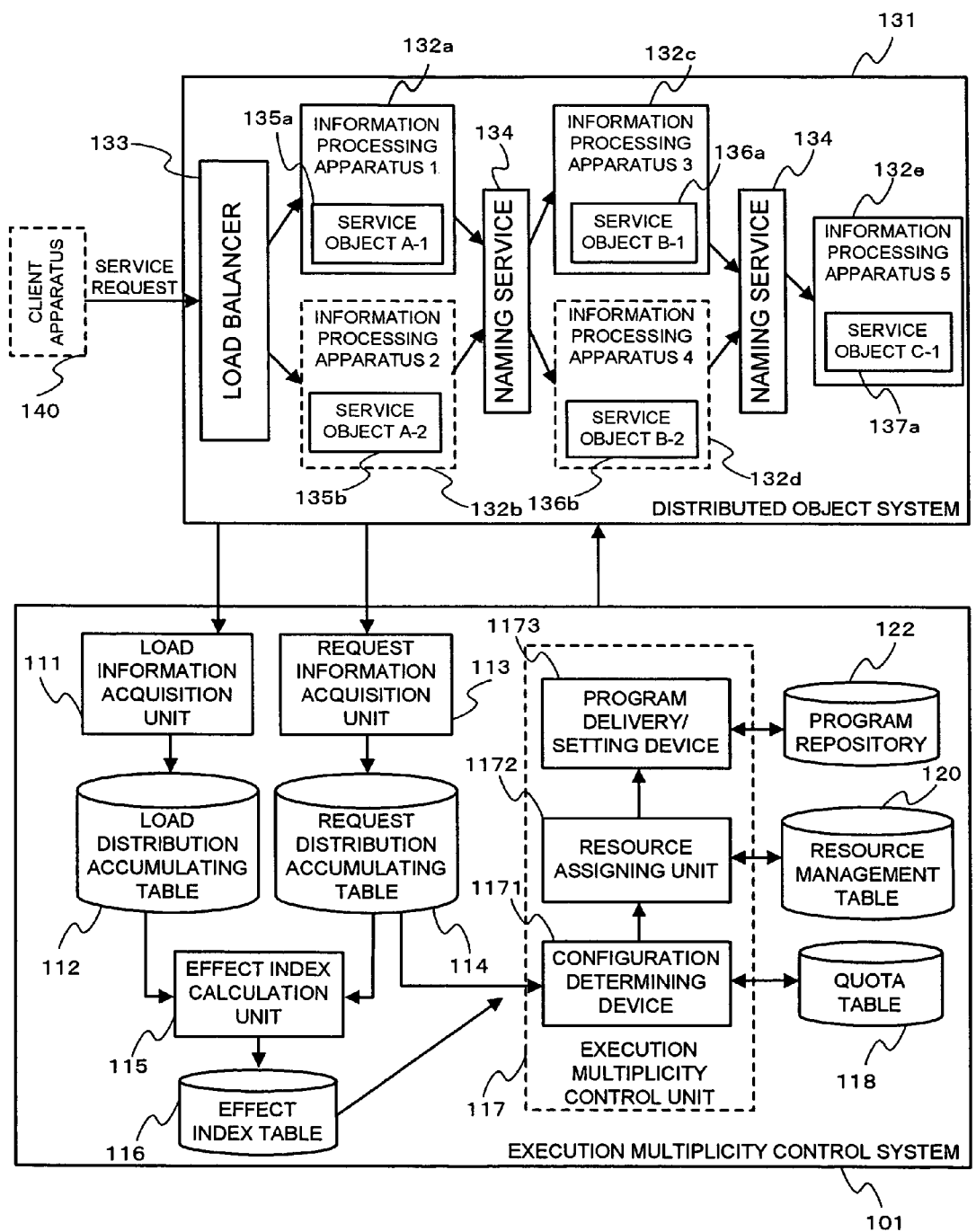
FIG. 1A shows the schematic configuration of an execution multiplicity control system 101 to be described as an embodiment of the present invention, and a distributed object system 131 to be a target of control by the execution multiplicity control system.

FIG. 1A shows a schematic configuration of an execution multiplicity control system for dynamically controlling the execution multiplicity (multiplicity) of the above service objects constituting the distributed object system that is a system realized by a plurality of service objects, and the service objects constituting the distributed object system, to be described as an embodiment of the present invention. The above service project is an object realized by execution of a program stored in a memory by a CPU. A service object provides a function that, for example, executes a process in response to a service request sent from a client apparatus and transmits the result of the process to the client apparatus.

The distributed object system 131 of the embodiment takes a configuration of Web three-layered system represented by an on-line book store. That is, as shown in FIG. 1A, a service object 135 is realized by executing a program arranged in a presentation layer, a service object 136 is realized by executing a program arranged in a logic layer, and a service object 137 is realized by executing a program arranged in a database layer. In the following description, a service request having a service request name of "REQ_001" inputted into the distributed object system shall be a service request for a search process for books, a service request having a service request name of "REQ_002" shall be a service request for an ordering process for books and a service request having a service request name of "REQ_003" shall be a service request of store staff for a sales amount inquiry process. In addition, a service object having a service name of "WEB_001" shall be a service object 135 arranged in the presentation layer, a service object having a service name of "AP_001" shall be a service object 136 arranged in the logic layer and a service object having a service name of "DB_001" shall be a service object 137 arranged in the database layer.

The configuration of the distributed object system 131 shown in FIG. 1A is common to a second to a fourth embodiments described later. Furthermore, the distributed object system 131 to be a target of the control by the execution multiplicity control system 101 is alone exemplified in FIG. 1. However, one execution multiplicity control system 101 can also control a plurality of distributed object systems 131. The distributed object system 131 according to the embodiment is assumed to do such control.

<Distributed Object System 131>

As shown in FIG. 1A, the distributed object system 131 comprises information processing apparatuses 1 to 5 (reference characters 132a to 132e), a load balancer 133 and a naming service 134. A client apparatus 140 shown in FIG. 1A is a computer that transmits service requests to the distributed object system 131.

The information processing apparatuses 1 to 5 (reference characters 132a to 132e), the load balancer 133 and the naming service 134 are respectively computers. The information processing apparatuses 1 to 5 (reference characters 132a to 132e), load balancer 133 and naming service 134 can take a configuration in which each of the above components is realized by a plurality of computers operating in cooperation with each other. As software to realize such cooperating operation, for example, software which realizes a load-distributed cluster or fail-over cluster can be listed.

As hardware for the above computers, computers such as personal computers, work stations or mainframes can be used. The information processing apparatuses 1 to 5 (reference characters 132a to 132e), the load balancer 133, the naming service 134 and the client apparatus 140 are respectively communicatively connected to each other by appropriate communication means not shown such as LAN (Local Area Network) (wired LAN or wireless LAN). The information processing apparatuses 1 to 5 (reference characters 132a to 132e), the load balancer 133 and the naming service 134 are respectively connected communicatively also with the execution multiplicity control system 101 through appropriate communication means such as LAN.

Figure 1B:
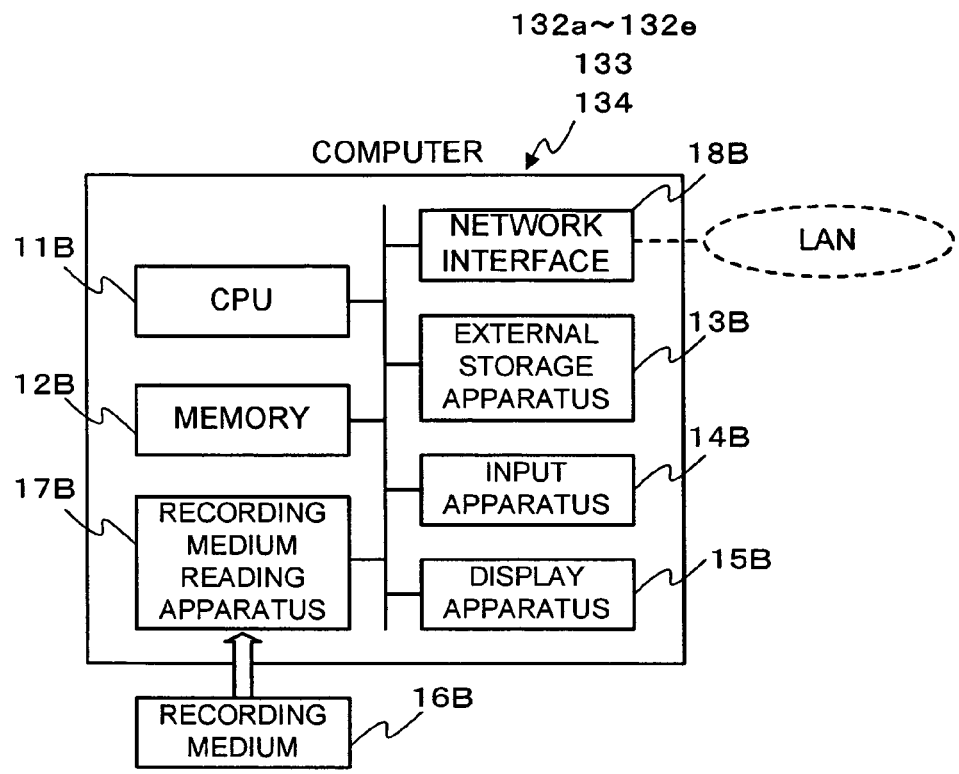
FIG. 1B is a block diagram of a typical computer used as the hardware for information processing apparatuses 1 to 5 (denoted by 132a to 132e), a load balancer 133 and a naming service 134, that realize the distributed object system 131 to be described in the embodiment of the present invention.

FIG. 1B shows a block diagram of a typical computer available as hardware of the information processing apparatuses 1 to 5 (reference characters 132a to 132e), the load balancer 133 and the naming service 134. The computer shown in FIG. 1B comprises a CPU (Central Processing Unit) 11B for executing the overall supervising control of the computer, a memory (ROM, RAM) 12B in which programs, data, etc., executed by the CPU are stored, an external storage apparatus 13B consisting of a hard disk drive, etc., an input apparatus 14B consisting of a keyboard, a mouse, etc., a display apparatus 15B such as a display, a recording medium reading apparatus 17B for reading out data and programs from a storage medium 16B such as a CD-ROM or a DVD-ROM, and a network interface 18B connected to a LAN.

The information processing apparatuses 1 to 5 (reference characters 132a to 132e) are computers (server apparatuses) providing an execution environment for the service objects 135 to 137 that realize the distributed object system. The service objects 135 to 137 realized in the information processing apparatuses 1 to 5 (reference characters 132a to 132e) respectively execute processes for service requests transmitted from the client apparatus 140. The objects are the objects that are realized by execution by the CPU 11B of programs stored in the memory 12B.

The service object 136 is an object necessary for the processing of the service object 135 and is, for example, an object to be invoked by program code of the service object 135. The service object 137 is an object necessary for the processing of the service object 136 and is an object to be invoked by program code of the service object 136.

The load balancer 133 is a computer that functions as a gateway apparatus for the client apparatus 140 operated by an end user, etc. The load balancer 133 accepts a service request transmitted from the client apparatus 140 and determines a service object that will execute processing for the service request. Then, the load balancer 133 transmits the service request to at least either the service object 135a (A-1) or the service object 135b (A-2) that runs on the information processing apparatus 1 (132a) or the information processing apparatus 2 (132b) having been determined as above. That is, the load balancer 133 carries out load balancing for the information processing apparatuses 135a and 135b by selecting a service object for processing the service request depending on the load on each of the information processing apparatuses 135a and 135b.

The naming service 134 is an object for realizing the load balancing for the information processing apparatuses 3 to 5 (reference characters 132c to 132e). The naming service 134 stores identification information of the service objects 135 to 137, and position information indicating the storage positions where the programs for realizing the service objects 135 to 137 are stored, associating these information with each other. When each of the service objects 135 to 137 notifies the identification information of the service object 135 to 137 to the naming service 134, the naming service 134 notifies position information of the program corresponding to the identification information notified. Cooperation in processing carried out among the service objects 135 to 137 is achieved by each of the service objects 135 to 137 starting up the program stored in the storage position corresponding to the position information notified. The naming service 134 stores a plurality of the position information for the identification information and can control such that, in responses to the plurality of inquiry requests with the same identification information attached, the position information changes between the plurality of position information for each of the responses. That is, thereby, the execution multiplicity of the service objects 135 to 137 can be controlled and a mechanism for distributing load over the service objects 135 to 137 can be easily realized.

<Execution Multiplicity Control System 101>

Figure 1C:
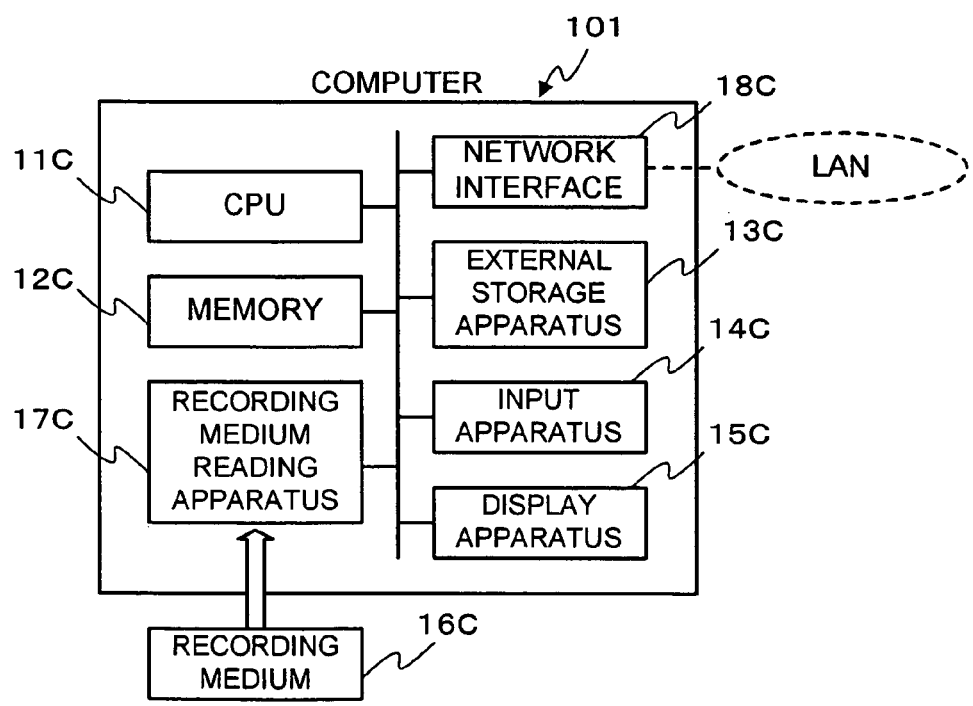
FIG. 1C shows a block diagram of a typical computer used as the hardware for the execution multiplicity control system 101 to be described as the embodiment of the present invention.

The execution multiplicity control system 101 shown in FIG. 1A is realized by computers, and programs executed in the computers. FIG. 1C shows a block diagram of a typical computer available as hardware for the execution multiplicity control system 101. The computer shown in FIG. 1C comprises a CPU (Central Processing Unit) 11C for executing the overall supervising control of the computer, memory (ROM, RAM) 12C in which programs, data, etc., executed by the CPU are stored, an external storage apparatus 13C consisting of a hard disk drive, etc., an input apparatus 14C consisting of a keyboard, a mouse, etc., a display apparatus 15C such as a display, a recording medium reading apparatus 17C for reading out data and programs from a storage medium 16C such as a CD-ROM or a DVD-ROM, a network interface 18C for connecting to a LAN 50.

As shown in FIG. 1A, the execution multiplicity control system 101 comprises a load information acquisition unit 111, a load distribution accumulating table 112, a request information acquisition unit 113, a request distribution accumulating table 114, an effect index calculation unit (an effect index calculation unit and a total effect index calculation unit) 115, an effect index table 116, an execution multiplicity control unit 117, a quota table 118, a resource management table 120, etc. The execution multiplicity control unit 117 includes functions such as a configuration determining device 1171, a resource assigning unit 1172 and a program delivery/setting device 1173.

Among the above units, the load information acquisition unit 111, the request information acquisition unit 113, the effect index calculation unit (the effect index calculation unit and the total effect index calculation unit) 115 and the execution multiplicity control unit 117 are realized by execution of programs stored in the memory 12C by the hardware and the CPU 11C of the computer described above that realizes the execution multiplicity control system 101. The load distribution accumulating table 112, the request distribution accumulating table 114, the effect index table 116, the quota table 118, a resource management table 120, etc., are stored in the memory 12C or the external storage apparatus 13C and managed by a database running on the computer described above.

The load information acquisition unit 111 measures a load on each of the service objects 135 to 137 constituting the distributed object system 131 being a target of the control by the execution multiplicity control system 101, obtains load distribution over the service objects 135 to 137 based on the measured loads, and writes the load distribution into the load distribution accumulating table 112 (registering and recording).

The request information acquisition unit 113 measures the number of service requests inputted into the distributed object system 131 from the client apparatus for each of the types of service requests, obtains request distribution being the distribution of the numbers of the service requests based on the number of service requests of each type measured, and writes the request distribution into the request distribution accumulating table 114 (registering and recording).

The effect index calculation unit (the effect index calculation unit and the total effect index calculation unit) 115 calculates an effect index being an index indicating the improvement effect of the processing efficiency of the distributed object system 131, for each service object for the case where the execution multiplicity of the service object is varied based on the load distribution, and writes the calculated effect indices into the effect index table 116 (registering and recording). In addition, the effect index calculation unit 115 calculates for each of the service objects 135 to 137 a total effect index being an index indicating the improvement effect of the processing efficiency of the distributed object system 131 for the case where the execution multiplicity of the service object is varied based on the calculated effect indices and the request distribution, and writes the total effect indices into the effect index table 116 (registering and recording) The effect index calculation unit (the effect index calculation unit and the total effect index calculation unit) 115 calculates an improvement effect (an effect by addition) for when the execution multiplicity of the service object 135 to 137 is increased, or an improvement effect (an effect by reduction) for when the execution multiplicity of the service object is decreased as the effect index or the total effect index.

The configuration determining device 1171 obtains the latest request distribution from the request distribution accumulating table 114 and determines the optimal execution multiplicity for the service objects 135 to 137 within the range with the upper limit (in this case, the total number of information processing apparatuses used for all of the service objects is five) determined from the number of the information processing apparatuses 132 that are the resources available for executing the service objects, acquired from the quota table 118.

The resource assigning unit 1172 carries out a process related to acquiring a resource (the information processing apparatus 132) necessary for operating the distributed object system 131 at the execution multiplicity determined by the configuration determining device 1171, from the resource management table 120 in which the use status of the resource (the information processing apparatus 132) is registered, the process including, for example, creation of the program delivery/setting script 1401 described later.

The program delivery/setting device 1173 executes the program delivery/setting script 1401 created by the resource assigning unit 1172 and actually controls the execution multiplicity according to the execution multiplicity control method determined by the configuration determining device 1171. For example, in the case where the service object 135 to 137 is caused to be additionally executed in a resource (information processing apparatus 132) in order to increase the execution multiplicity of the service object, the program delivery/setting device 1173 reads out from the program repository 122 the program files and data necessary for executing the service object, and transfers the read-out programs files and data to the resource (information processing apparatus 132) to be caused to execute additionally the service object. The program delivery/setting device 1173 transmits an instruction to perform setting and installation necessary for executing the above service object to the resource (information processing apparatus 132), and in contrast, in the case where the execution multiplicity of the service objects 135 to 137 is decreased, transmits to the above resource (the information processing apparatus 132) an instruction to stop the execution of or delete the program files and data realizing the above service object. Then, after executing the transfer or deletion of the program files and data to the resource (the information processing apparatus 132) as described above, the program delivery/setting device 1173 transmits an order (a re-setting command) for causing the balancing object system 131 to execute load distribution in a new form, to the load balancer 133 and the naming service 134 and executes re-setting of the whole distributed object system 131.

The program delivery/setting device 1173 returns the resource (a server machine) to be deleted to the resource management table 120 in the resource assigning unit 1172, and the program delivery/setting device 1173 deletes the programs and the data of the above service object from the returned resource and re-sets the whole distributed object system 131.

<Load Distribution Accumulating Table 112>

FIG. 2 shows an example of a load distribution accumulating table 112. In the load distribution accumulating table 112, the result of the measurement of load for each of the service objects 135 to 137 that realize the distributed object system 131 is registered accumulated in the form of load distribution. The load distribution accumulating table 112 is provided with a system ID column 201 in which system IDs that are the identification information of distributed object systems 131 are set, a measurement ID column 202 in which measurement IDS that are the identification information indicating how many measurements have been carried out including this measurement are set, a service name column 203 in which service names that are the identification information of the measured service objects 135 to 137 are set, a machine ID column 204 in which the information processing apparatuses 132 in which service objects corresponding to the service names are operating are set, a load rate column 205 in which the rate of load on each service object to that of the whole distributed object system 131 is set, etc. The system ID column 201 is an item necessary to be managed because the execution multiplicity control system 101 controls a plurality of distributed object systems 131.

The data listed in the first row in the data group denoted by a reference numeral 211 in FIG. 2 shows that the load rate of the service object 135 having the service name of "WEB_001" realized in the information processing apparatus 132 having a machine ID of "M001" is "80", in a measurement of which the measurement ID is "1" for the distributed object system 131 having a system ID of "SYS_001". The data in the second row shows that the load rate of the service object 136 having the service name of "AP_0011" realized in the information processing apparatus 132 having a machine ID of "M002" is "20". The data in the third row shows that the load rate of the service object having the service name of "DB_001" realized in the information processing apparatus 132 having a machine ID of "M003" is "0". The data denoted by reference numerals 212 to 216 are also interpreted similarly.

<Request Distribution Accumulating Table 114>

FIG. 3 shows an example of the request distribution accumulating table 114. In the request distribution accumulating table 114, for the service requests accepted by the load information acquisition unit 111 while the unit 111 is collecting load information, the rate of the number of service requests for each type of service request is registered accumulated. The request distribution accumulating table 114 is provided with a system ID column 301 in which system IDs that are the identification information of distributed object systems 131 to be controlled by the execution multiplicity control system 101 are set, a measurement ID column 302 in which measurement IDs indicating how many measurements have been carried out including this measurement are set, a service request name column 303 in which service request names that are identification information indicating the types of the measured service requests are set, a service request rate column 304 in which the rate of the number of the service requests of each type mentioned above to the number of all the service requests accepted by the distributed object system 131 are set, etc. The system ID column 301 is an item necessary to be managed because the execution multiplicity control system 101 controls a plurality of distributed object systems 131.

The data listed in the first row in the data group denoted by a reference numeral 311 in FIG. 3 shows that the proportion which the number of service requests having the service request name of "REQ_001" accounts for is "100" in a measurement of which the measurement ID is "1" for the distributed object system 131 having a system ID of "SYS_001". The data in the second row shows that the proportion which the number of service requests of the type "REQ_002" accounts for is "0". The data in the third row shows that the proportion which the number of service requests of the type "REQ_003" accounts for is "0". The data denoted by reference numerals 212 to 216 are also interpreted similarly.

<Effect Index Table 116>

FIG. 4 shows an example of the effect index table 116. The effect index table 116 is provided with a system ID column 401 in which system IDs that are identification information for distributed object systems 131 are set, a service request name column 402 in which service request names are set, a service name column 403 in which service names that are the identification information of the service objects 135 to 137 are set, an additional effect index column 404 in which addition effect indices are set, a deletion effect index column 405 in which deletion effect indices are set, etc. The addition effect index is an effect index indicating, for the series of service objects 135 to 137 invoked by service requests, how much load distribution effect is acquired for the distributed object system 131 when the execution multiplicity of each of the service objects 135 to 137 is increased by one. Then, the deletion effect index is an effect index indicating how much effect is acquired for the distributed object system 131 when the execution multiplicity of the service object 135 to 137 is decreased by one.

The data denoted by a reference numeral 411 in FIG. 4 shows that the effect index (addition effect index) acquired when the execution multiplicity of the service object having the service name 403 of "WEB_001" is increased by one is "40" in the case where a service request having the service request name of "REQ_001" is processed in the distributed object system 131 having the system ID 401 of "SYS_001". The data denoted by a reference numeral 412 shows that the effect index (addition effect index) acquired when the execution multiplicity of the service object having the service name 403 of "AP_001" is increased by one is "10" in the case where a service request having the service request name of "REQ_001" is processed in the distributed object system 131 having the system ID 401 of "SYS_001".

The data denoted by a reference numeral 413 shows that the addition effect index acquired when the execution multiplicity of the service object having the service name of "DB_001" is increased by one is "0" in the case where a service request having the service request name of "REQ_001" is processed in the distributed object system having the system ID 401 of "SYS_001".

All of the data denoted by the reference numerals 411 to 413 are data for the case where the executing multiplicity is one for each of the service objects. Therefore, as to these data, no value is set in the deletion effect index column 405 because the execution multiplicity cannot be decreased any more for these data ("−" is set). The data denoted by a reference numeral 421 is for the case where the execution multiplicity is two or above, and "−10" is set as the deletion effect index.

<Quota Table 118>

FIG. 5 shows an example of the quota table 118. In the quota table 118, the number of the information processing apparatuses 132 that can be used by the distributed object system 131 to realize service objects, and the number of the information processing apparatuses 132 currently used are managed. The quota table 118 is provided with a system ID column 501 in which identification information of distributed object systems 131 is set, a maximum number of machines column 502 in which the maximum number of information processing apparatuses 132 that can be used by the distributed object system 131 is set and a number-of-currently-used-machines column 503 in which the number of information processing apparatuses currently used is set. The data denoted by the reference numeral 511 in FIG. 5 shows that the number of information processing apparatuses 132 that can be used for realizing service objects is five and three apparatuses 132 are used currently already for the distributed object system 131 having the system ID of "SYS_001".

<Resource Management Table 120>

FIG. 6 shows an example of the resource management table 120. The resource management table 210 is a table in which information indicating which server machine is assigned to which system and whether or not a server machine is available with the server machine not assigned to any system is managed. The resource management table 120 is provided with a machine ID column 601 in which machine IDs that are the identification information of the information processing apparatuses 132 are set and a system ID column 602 in which system IDs of distributed object systems 131 using currently the information processing apparatuses 132 are set.

The data denoted by reference numerals 611 to 613 in FIG. 6 show that the information processing apparatuses 132 having the machine IDs of "M_001", "M_002" and "M_003" are assigned to the distributed object system 131 having the system ID of "SYS_001". The data having the reference numerals 612 and 613 are also interpreted similarly. The data denoted by a reference numeral 614 has empty data for the system ID column 602 and this shows that the information processing apparatus 132 is not assigned currently to any of distributed object systems 131.

<Program Repository 122>

Figure 7:
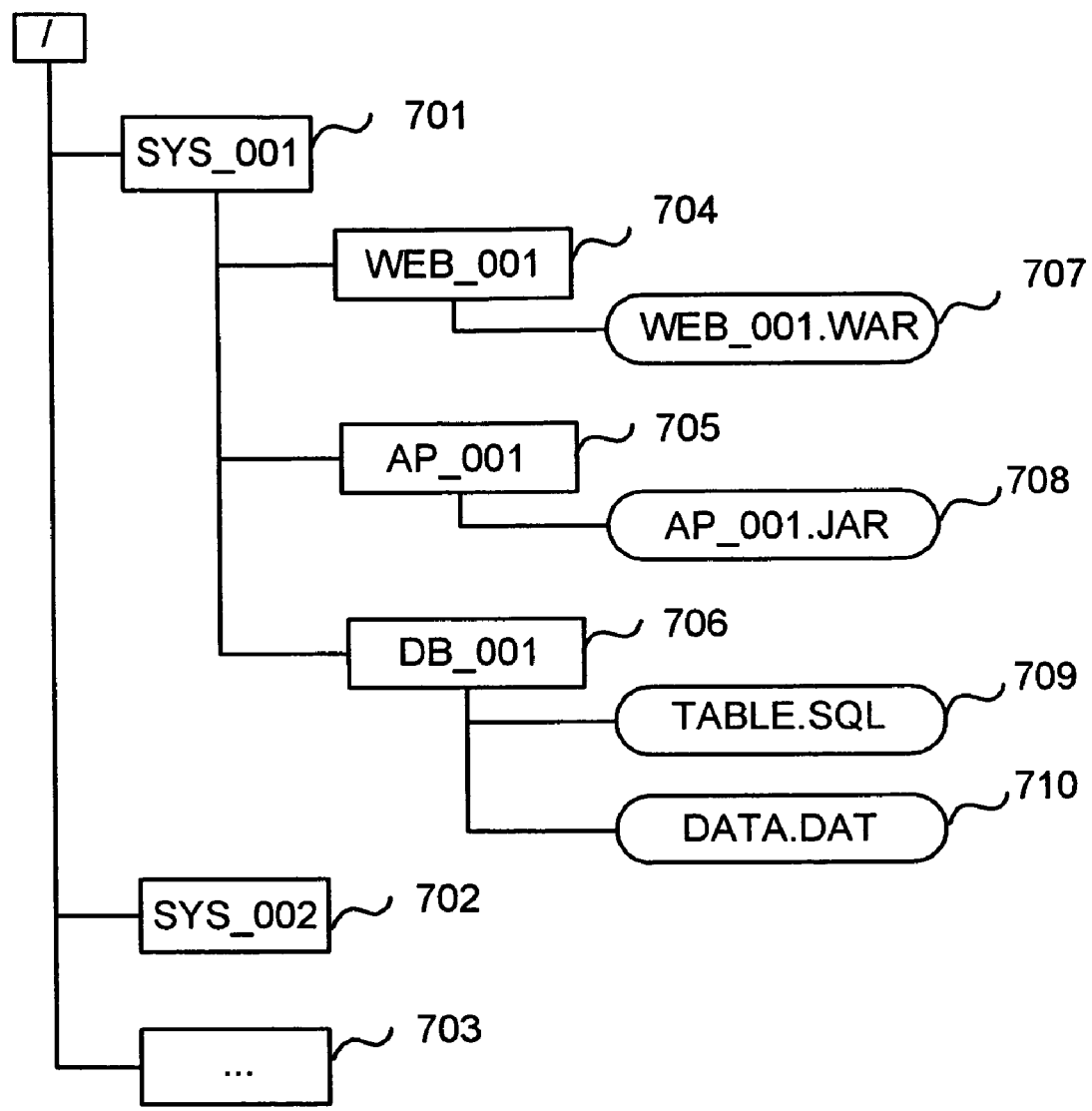
FIG. 7 shows an example of a program repository 122 to be described in the embodiment of the present invention.

FIG. 7 shows an example of the program repository 122. The program repository 122 is a database in which the program files and the data used for realizing the distributed object system 131 are managed. The program repository 122 is constructed on a file system realized by an operating system executed on a computer realizing the execution multiplicity control system 110. The program repository 122 is provided with a folder (a directory) (701 to 703) storing program files and data for each system ID and, thereby, for which distributed object system 131 the program files and the data used for realizing each of the service objects 135 to 137 are used can be distinguished. In addition, a folder corresponding to a system ID is provided with lower folders (704 to 706) respectively for each of the service objects 135 to 137 and, in each of these folders, program files and data necessary for realizing the corresponding service object 135 to 137 are stored (recorded).

In the example of the program repository 122 shown in FIG. 7, the program files and the data for the system ID of "SYS_001" are stored under a folder (a directory) denoted by a reference numeral 701. Among the folders, the folder denoted by a reference numeral 704 stores a program file 707 having the file name of "WEB_001.WAR" that is a program file for realizing a service object having the service name of "WEB_001". A folder denoted by a reference numeral 705 stores a program file 708 with the file name represented as "AP_001.JAR" for realizing a service object having the service name of "AP_001". A folder denoted by a reference numeral 706 stores data (a setting file) 709 and data (a setting file) 710 with the file names represented as "TABLE.SQL" and "DATA.DAT" that are the files for realizing a service object having the service name of "DB_001".

<Processing by Load Information Acquisition Unit 111>

Figure 8:
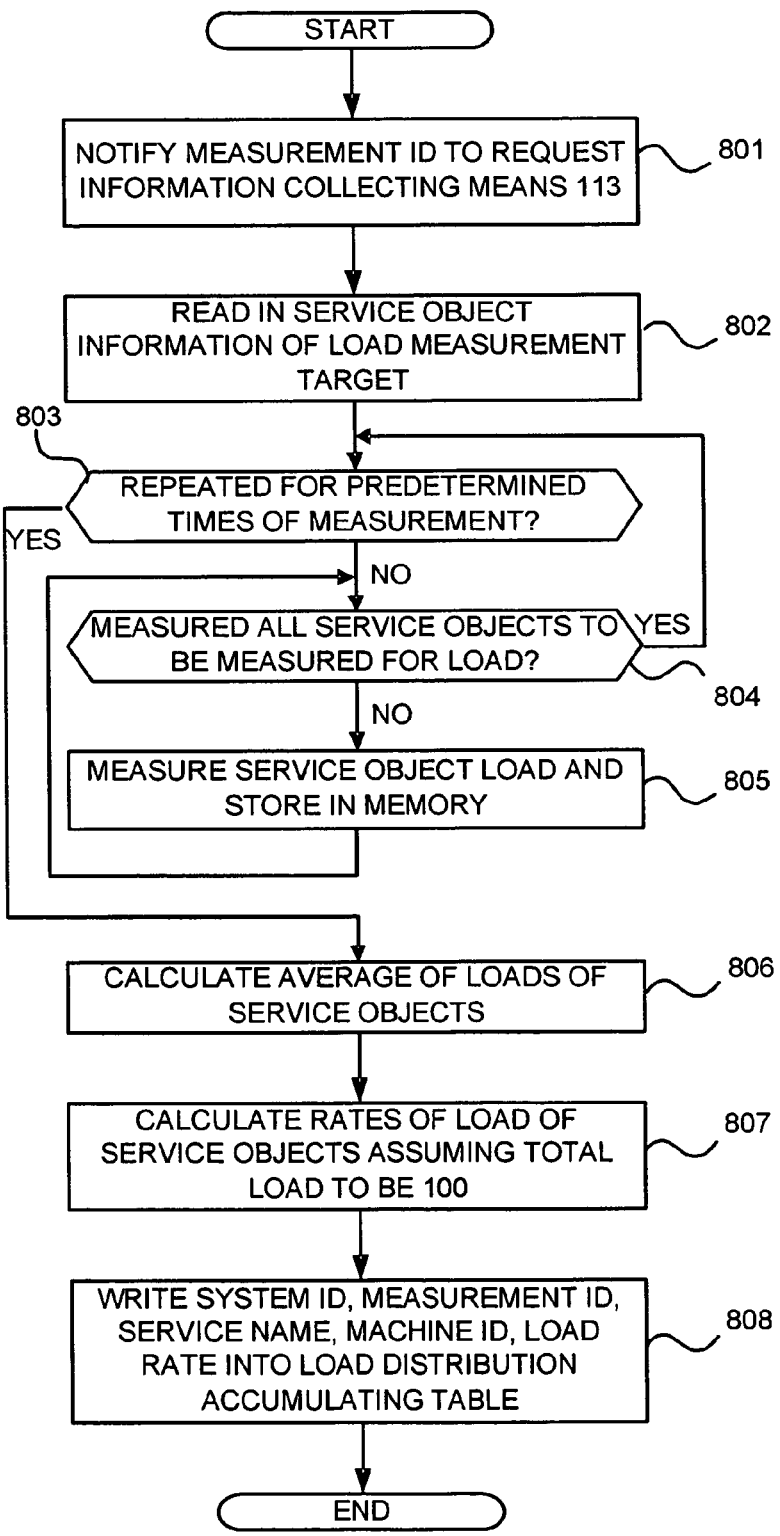
FIG. 8 is a flowchart describing the flow of a process carried out by a load information acquisition unit 111 to be described in the embodiment of the present invention.

FIG. 8 is a flowchart describing the flow of the process carried out by the load information acquisition unit 111.

First, the load information acquisition unit 111 determines a measurement ID for identifying uniquely a series of information to start to measure and collect, and transmits the determined measurement ID to the request information acquisition unit 113 (step 801). The transmission of the measurement ID to the request information acquisition unit 113 is necessary because the processing by the load information acquisition unit 111 and the processing by the request information-acquisition unit 113 need to be carried out concurrently.

Next, the load information acquisition unit 111 reads out the list of the service objects 135 to 137 to be the targets of load measurement (step 802). This list may be managed by any component in the execution multiplicity control system 101 and is, for example, stored in the resource assigning unit 1172, etc.

Next, the load information acquisition unit 111 repeats the load measurements for a predetermined number of times for each of the service objects 135 to 137 read out (steps 803 to 805). The load information acquisition unit 111 judges whether or not the measurements have been repeated for the predetermined times in the judgment made at step 803. The load information acquisition unit 111 proceeds to step 804 if the judgment made at step 803 is "NO". At step 804, the load information acquisition unit 111 judges whether or not the measurement is carried out for all of the service objects 135 to 137 that are the target of the load measurement (step 804). The load information acquisition unit 111 carries out the measurement of the load on the service objects and stores the measured load on the service objects 135 to 137 into the memory 12C if the judgment made at step 804 is "NO" (step 805). The load information acquisition unit 111 carries out the measurement of the load using, for example, a method described in the Japanese Patent Application Laid-open Publication No. 05-143559. That is, the load information acquisition unit 111 sends out by broadcasting a message for inquiring about load to the information processing apparatuses 132 realizing the distributed object system 131 and obtains the load on each of the information processing apparatuses 132 in each reception of the responses to the inquiry.

Next, the load information acquisition unit 111 calculates the average value (or the sum) of the loads on the service objects 135 to 137 acquired through the above processing (step 806). Then, the load information acquisition unit 111 calculates the rate of the load (load distribution) for each of the service objects 135 to 137 assuming that the total of the loads is 100.

Next, the load information acquisition unit 111 writes into the load distribution accumulating table 112 the calculated rates of load such that the rates are associated with the system ID, the measurement ID, service names and machine IDS (registering and recording) (step 808). As described above, the rates of load are written into the load distribution accumulating table 112.

<Processing by Request Information Acquisition Unit 113>

Figure 9:
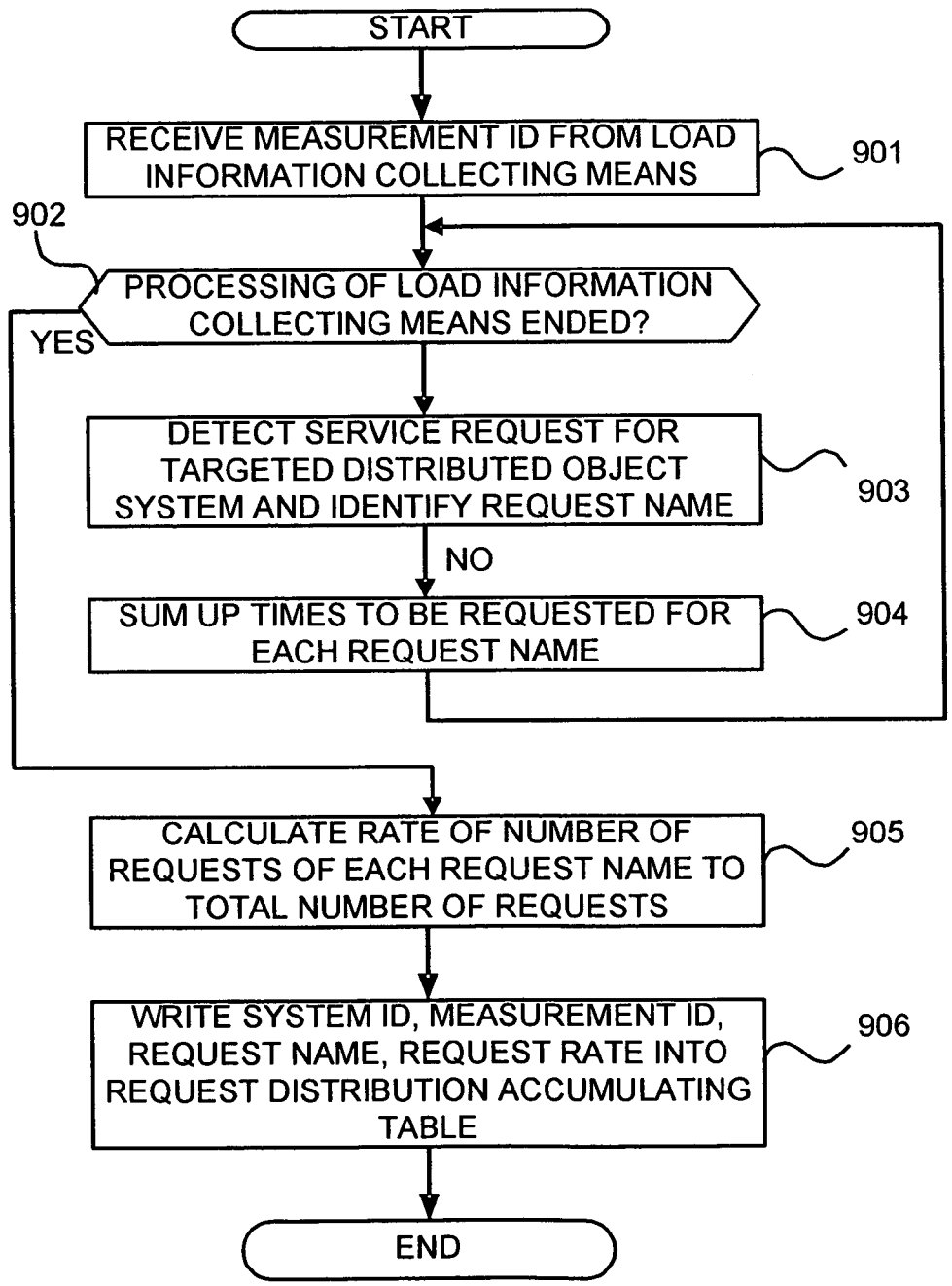
FIG. 9 is a flowchart describing the flow of a process carried out by a request information acquisition unit 113 to be described in the embodiment of the present invention.

FIG. 9 is a flowchart describing the flow of the process carried out by the request information acquisition unit 113. As mentioned in the description of the processing by the load information acquisition unit 111, the processing by the request information acquisition unit 113 needs to be carried out concurrently with the processing by the load information acquisition unit 111. At step 901, the request information acquisition unit 113 receives the measurement ID transmitted from the load information acquisition unit 111 (step 901).

At step 902, the request information acquisition unit 113 judges whether or not the processing by the load information acquisition unit 111 has been finished (step 902). Here, the request information acquisition unit 113 continues to measure the types of the service requests (service request names) and the number of the requests transmitted from the client apparatus 140 to the distributed object system 131 until step 902 results in "YES". Here, when the step 902 has resulted in "YES" is the time when, for example, a pre-set measurement time period has passed.

During the measurement, the request information acquisition unit 113 identifies a service request name to a distributed object system 131 that is a target (step 903) and measures the number of request times for each service request name (step 904). The request information acquisition unit 113 identifies the types of the service request for the distributed object system 131 using, for example, a method described in the Japanese Patent Application Laid-open Publication No. 2002-91936. That is, the request information acquisition unit 113 identifies the type of a service request based on, for example, information described in the header of the HTTP (HyperText Transfer Protocol).

Next, when the measurement has been finished (step 902: YES), the request information acquisition unit 113 calculates the rate of the number of service requests of each type to the total number of the service requests measured (request distribution) (step 905).

Next, the request information acquisition unit 113 writes into the request distribution accumulating table 114 the above calculated request distribution such that the distribution is associated with the system ID, measurement ID and service request names (registering and recording) (step 906).

<Example of Measured Results>

The content of the request distribution accumulating table 144 shown in FIG. 3 is an example of the measurement results acquired from the processing by the load information acquisition unit 111 and the request information acquisition unit 113 described above. In the measurement results shown in FIG. 3, the data denoted by the reference numerals 311 to 313 are data acquired experimentally at, for example, a point in time before the practical operation of the distributed object system. The data denoted by the reference numerals 311 to 313 in FIG. 3 are data measured when each of the service objects having the service names of respectively "WEB_001", "AP_001" and "DB_001" is executed by one information processing apparatus 132, that is, the data measured when the execution multiplicity is one for each of the service objects.

The data denoted by the reference numeral 311 is data for the measurement ID of "one". In the measurement, only service requests having the service request name of "REQ_001" are inputted into the distributed object system 131. Therefore, the rate of service request is "100%" only for the service requests having the service request name of "REQ_001" and the rate of service request for other service requests is "0%". The data denoted by the reference numeral 312 is data for a measurement ID of "2". In this measurement, only service requests having the service request name of "REQ_002" are inputted into the distributed object system. Therefore, the rate of service request is "100%" only for the service requests having the service request name of "REQ_002" and the rate of service request for other service requests is "0%". Furthermore, the data denoted by the reference numeral 313 is data for a measurement ID of "1". In this measurement, only service requests having the service request name of "REQ_003" are inputted into the distributed object system. Therefore, the rate of service request is "100%" only for the service requests having the service request name of "REQ_003", and the rate of service request for other service requests is "0%".

The above data denoted by the reference numerals 311 to 313 each correspond to the load distribution measured when one type of service requests are inputted into the distributed object system 131. That is, in the embodiment, as exemplified by the data denoted by the reference numerals 311 to 313, at, for example, a point of time before the practical operation is started, in order to acquire an effect index in advance, measurement is carried out for the case where one type of service requests are inputted, and the load distribution for that case is calculated.

The data denoted by the reference numerals 211 to 213 in FIG. 2 are a load distribution acquired concurrently with the measurements denoted by the reference numerals 311 to 313 in FIG. 3 respectively. In the measurement having the measurement ID of "1" and denoted by the reference numeral 211, the rate of load of the service object having the service name of "WEB_001" is "80%", the rate of load of the service object having the service name of "AP_001" is "20%", and the rate of load of the service object having the service name of "DB_001" is "0%". In the measurement having the measurement ID of "2" and denoted by the reference numeral 212, the rate of load of the service object having the service name of "WEB_001" is "40%", the rate of load of the service object having the service name of "AP_001" is "40%", and the rate of load of the service object having the service name of "DB_001" is "20%". Furthermore, in the measurement having the measurement ID of "3" and denoted by the reference numeral 213, the rate of load of the service object having the service name of "WEB_001" is "10%", the rate of load of the service object having the service name of "AP_001" is "30%", and the rate of load of the service object having the service name of "DB_001" is "60%".

As described above, in this embodiment, as the form of the distributed object system 131, a WEB three-layered system realizing an on-line book store is assumed and "REQ_001" is a service request for a search process for books. "REQ_002" is a service request for an ordering process for books. "REQ_003" is a service request of store staff for a sales amount inquiry process. Therefore, as shown in the data denoted by the reference numerals 211 to 213 in FIG. 2, the rate of load of the service object "WEB_001" is high in the processing for the service request having the service request name of "REQ_001", the rate of load of the service object "AP_001" is high in the processing for the service request having the service request name of "REQ_002" and the rate of load of the service object "DB_001" is high in the processing for the service request having the service request name of "REQ_003".

<Processing by Effect Index Calculation Unit 115>

Figure 10:
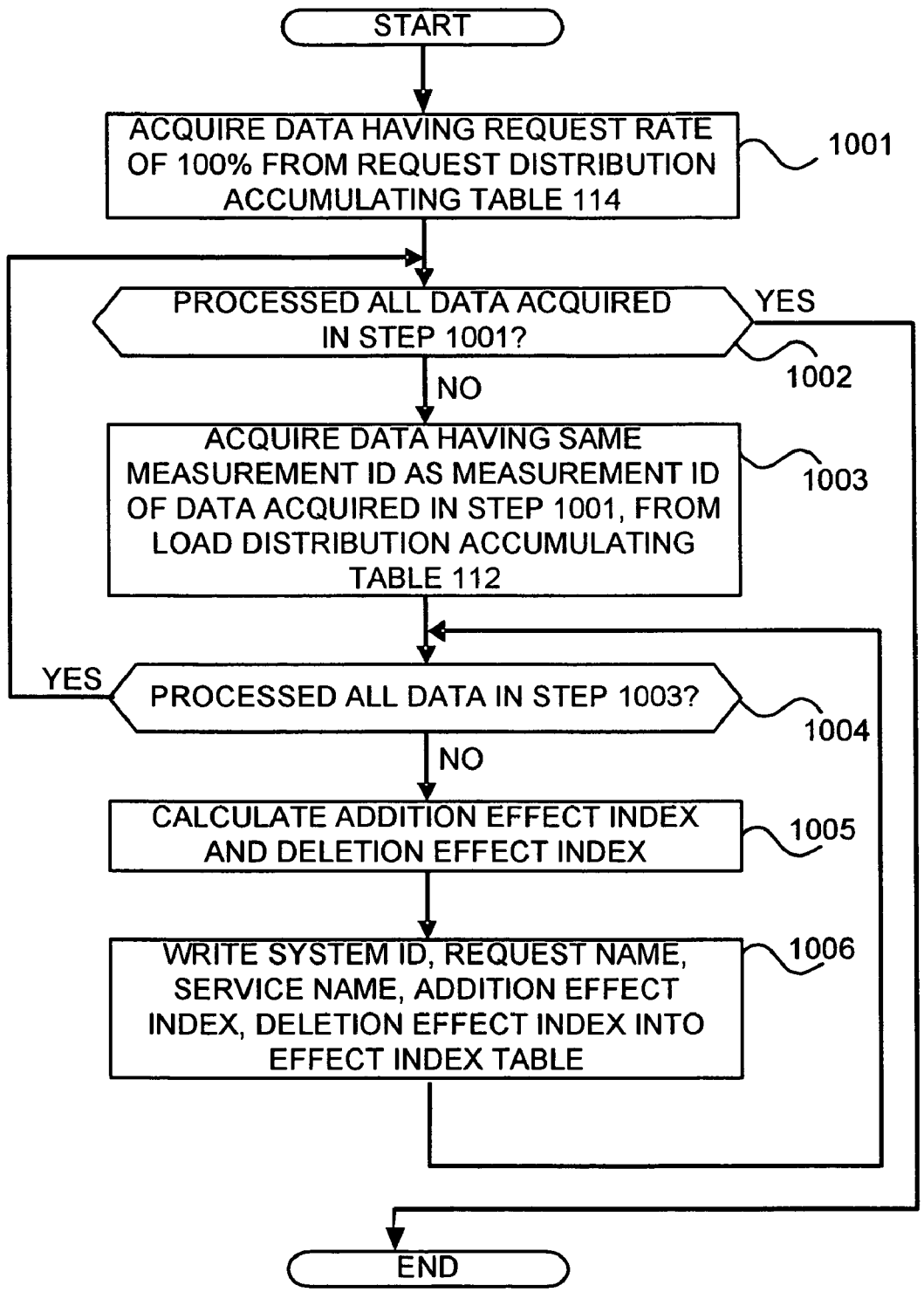
FIG. 10 is a flowchart describing the flow of a process carried out by an effect index calculation unit 115 to be described in the embodiment of the present invention.

FIG. 10 is a flowchart describing the flow of the processing carried out by the effect index calculation unit 115. The effect index calculation unit 115 produces the effect index table 116 shown in FIG. 4 based on the data written in the load distribution accumulating table 112 and the request distribution accumulating table 114.

In producing the effect index table 116, the effect index calculation unit 115 first extracts data for which "100%", is set in the service request rate column 304, from the request distribution accumulating table 114 shown in FIG. 3 (step 1001).

Next, the effect index calculation unit 115 executes steps 1003 to 1006 on the extracted data as the target.

At step 1002, the effect index calculation unit 115 judges whether or not the processes denoted by steps 1003 to 1006 have been carried out, for all the data extracted at step 1001 (step 1002).

At step 1003, the effect index calculation unit 115 extracts from the load distribution accumulating table 112 the data corresponding to the measurement ID of the extracted data (step 1003). At step 1004, the effect index calculation unit 115 judges whether or not the processing has been carried out for all the data extracted at step 1003.

At step 1005, the effect index calculation unit 115 calculates the addition effect index and the deletion effect index based on the data acquired at step 1001 and the data acquired at step 1003 (step 1005). The detailed mechanism for calculating the addition effect index and the deletion effect index will be described later.

Next, the effect index calculation unit 115 writes into the effect index table 116 the calculated addition effect index and the deletion effect index such that the indices are associated with the system ID, the service request name and the service name (registering and recording) (step 1006). As described above, the effect index table 116 is produced.

<Mechanism for Calculating Addition Effect Index and Deletion Effect Index>

Description will then be given of the mechanism for the calculation of the addition effect index and the deletion effect index carried out in the above step 1005 by the effect index calculation unit 115.

The addition effect index is an index indicating the effect acquired when the execution multiplicity of a service object is increased by one. As shown in the load distribution accumulating table 112 shown in FIG. 2, for example, for the service object having the service name of "WEB_001", the load rate when the object was operating with the execution multiplicity of one was "80". Here, when the execution multiplicity of the service object is increased by one to two, the load rate becomes "80/2=40". Then, when the execution multiplicity is increased to three, the load rate becomes "80/3=27".

In the embodiment, the difference in the load rate between before and after the execution multiplicity of a service object is increased by one is the addition effect index. That is, in the above example, the addition effect index acquired when the execution multiplicity is increased from one to two is "80−40=40" and the addition effect index acquired when the execution multiplicity is increased from two to three is "40−27=13". That is, the addition effect index acquired when the multiplicity is increased by one can be formulated as "(load rate/the current multiplicity)−(load rate/the current multiplicity+1)". The values in the addition effect index column 404 for the data denoted by the reference numerals 411 to 419 in the effect index table 116 in FIG. 4 are addition effect indices acquired as described above.

As described above, the data denoted by the reference numerals 311 to 313 in FIG. 3 are each a rate of request in the case where one type of service requests are inputted into the distributed object system 131, and the data denoted by the reference numerals 211 to 213 in FIG. 2 are each a load distribution in the case where one type of service requests are inputted into the distributed object system 131. That is, the values in the addition effect index column 404 for the data denoted by the reference numerals 411 to 419 in the effect index table 116 in FIG. 4 are addition effect indices for the case where the execution multiplicity of each service object is increased from one to two.

With the same method as the method for the addition effect index, the deletion effect index can be formulated as "(load rate/(the current multiplicity+1))−(load rate/the current multiplicity)" and a deletion effect index for the case where the execution multiplicity is decreased by one can be acquired from the above formula. However, the data corresponding to the reference numerals 411 to 419 in the effect index table 116 in FIG. 4 are based on the data denoted by the reference numerals 211 to 213 shown in FIG. 2 and the data denoted by the reference numerals 311 to 313 shown in FIG. 3, and thus are based on the load distribution and the request distribution measured in the case where the execution multiplicity of each service request is one. Therefore, the execution multiplicity cannot be decreased any more for any of the service objects. This is the reason why no value is set in the deletion effect index column 405 for the data corresponding to the reference numerals 411 to 419 in the effect index table 116 in FIG. 4.

<Control of Execution Multiplicity>

Next, the flow of the processing for determining the execution multiplicity of each of the service objects carried out by the configuration determining device 1171 of the execution multiplicity control unit 117 during the operation of the distributed object system will be described referring to the flowchart shown in FIG. 11.

Here, it is assumed that the distributed object system is operating in a state where the execution multiplicity of the service object having the service name of "WEB_0011" is three, the execution multiplicity of the service object having the service name of "AP_001" is one, and the execution multiplicity of the service object having the service name of "DB_001" is one. In addition, "during the operation" shall include the time when the practical operation of the distributed object system is started. Furthermore, it is assumed that the request distribution of the distributed object system in that case is the data denoted by the reference numeral 314 in FIG. 3 wherein the request rate of service requests having the service request name of "REQ_001" is 60%, the request rate of service requests having the service request name of "REQ_002" is 30% and the request rate of service requests having the service request name of "REQ_003" is 10%. Furthermore, the contents of the effect index table 116 are assumed to be in a state shown in FIG. 16. In addition, in FIG. 16, the representations in round brackets in the addition effect index column 404 indicate the variation of the execution multiplicity. For example, for the data denoted by the reference numeral 1611 in FIG. 16, "(3→4)" is written in the addition effect index column 404, which indicates that the execution multiplicity of a service object realizing a service name "WEB_001" is varied from three to four.

Figure 11:
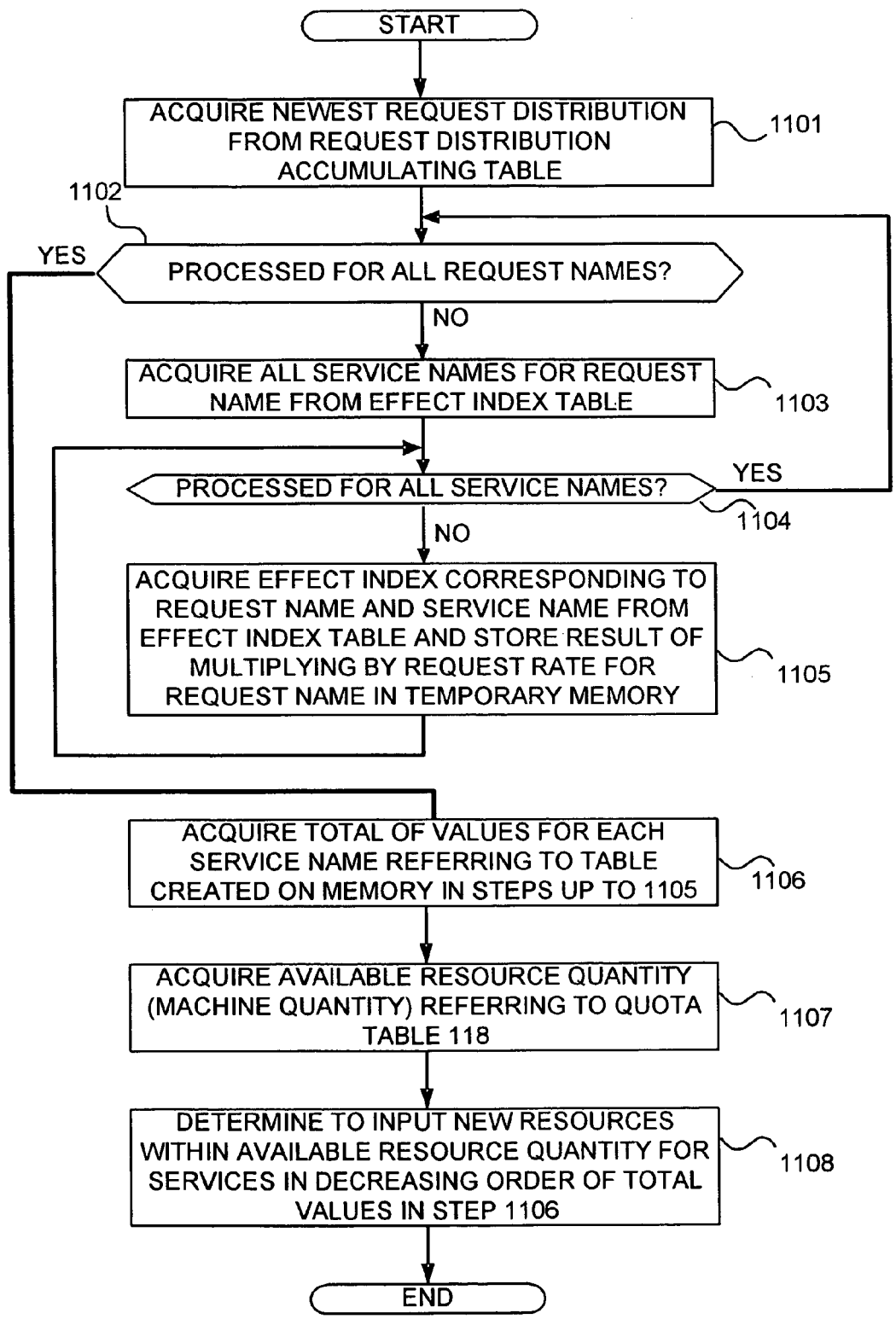
FIG. 11 is a flowchart describing the flow of a process carried out by a configuration determining device 1171 to be described in the embodiment of the present invention.

In the flowchart shown in FIG. 11, first, in order to acquire the latest request distribution, the configuration determining device 1171 obtains the latest request distribution (the data denoted by the reference numeral 314 in FIG. 3) from the request distribution accumulating table 114 (step 1101).

Next, the configuration determining device 1171 judges whether or not the processes of steps 1103 to 1105 have been carried out on the data acquired at step 1101 (step 1102).

Next, the configuration determining device 1171 obtains the data corresponding to a specific service request name (for example, data having the service request name of "REQ_001", denoted by the reference numerals 1611 to 1613 in FIG. 16) from the effect index table 116 shown in FIG. 16 (step 1103).

Next, the configuration determining device 1171 judges whether or not the process of step 1105 has been carried out on all of the data acquired in step 1103 (step 1104).

Next, for each of the data acquired in step 1103, the configuration determining device 1171 obtains the product of the addition effect index in the effect index table 116 shown FIG. 16 and the value set in the service request rate column 304 in the request distribution accumulating table 114 corresponding to the service request name of each of the data, acquired in step 1101 (step 1105). Then, the configuration determining device 1171 writes into a table shown in FIG. 12 (hereinafter, referred to as "temporary table 1200") the value obtained by dividing the obtained product by 100 managed on the memory 12C such that the obtained value is associated with the service name and the service request name (registering and recording). The temporary table 1200 is a table temporarily created on the memory by the configuration determining device 1171. The temporary table 1200 is provided with a service name column 1201 in which service names are set, a service request name column 1202 in which service request names are set, an addition effect index column 1203 in which addition effect indices are set and a deletion effect index column 1204 in which deletion effect indices are set.

The processing of step 1105 will be described in detail. In the case where, in step 1103, the latest request distribution acquired from the request distribution accumulating table 114 is the data denoted by, for example, the reference numeral 314 in FIG. 3, and an addition effect index is obtained based on the service request name of "REQ_001" and the service name of "WEB_001" (the data denoted by a reference numeral 411 in FIG. 4 (the data denoted by a reference numeral 1611 in the effect index table 116 in FIG. 16)), the addition effect index can be represented as the value obtained by dividing by 100 the product of "60" acquired from the data denoted by the reference numeral 314 in FIG. 3 and "6.7" being the addition effect index of the data denoted by the reference numeral 1611 in FIG. 16, that is, as "60×6.7/100=4.0". Similarly as above, the deletion effect index can be represented as a value obtained by dividing by 100 the product of "60" acquired from the data denoted by the reference numeral 314 in FIG. 3 and "−13.3" being the deletion effect index in the data denoted by a reference numeral 1611 in FIG. 16, that is, as "60*(−13.7)/100=−8.0".

Therefore, in this case, the configuration determining device 1171 respectively writes "WEB_001" into the service name column 1201, "REQ_001" into the service request name column 1202, "4.0" into the addition effect index 1203 and "−8.0" into the deletion effect index 1204 in the temporary table 1200 (the data denoted by the reference numeral 1211 in FIG. 12). By similar processing, because three cases of service request name and three cases of service name are present in the example shown in FIG. 16 immediately before the next step 1106 is executed, a total of nine data entries are created in the temporary table 1200 consequently (the data denoted by the reference numerals 1211 to 1219 in FIG. 12).

At step 1106, the configuration determining device 1171 refers to the temporary table 1200, calculates a sum for each of the addition effect index 1203 and the deletion effect index 1204 in the temporary table 1200 (a total effect index) for each of the service names and writes the result into the temporary table 1200 (registering and recording) (step 1106).

Because three cases of service name,"WEB_001", "AP_001" and "DB_001", are present in the embodiment, the configuration determining device 1171 additionally writes three data entries into the temporary table 1200 (the data denoted by reference numerals 1220 to 1222 in FIG. 12).

Next, the configuration determining device 1171 refers to the quota table 118 shown in FIG. 5 and obtains the maximum number of information processing apparatuses 132 that can be used by the distributed object system 131 (step 1107). Since this example relates to the distributed object system 131 having the system ID of "SYS_001", the data denoted by the reference numeral 511 in FIG. 5 is referred to by the configuration determining device 1171. In this case, the configuration determining device 1171 obtains "five" as the maximum number of information processing apparatuses 132 that can be used.

At step 1108, the configuration determining device 1171 controls the execution multiplicity of the service objects in the distributed object system 131 by applying a manner of varying the corresponding execution multiplicity of the service objects in descending order of the sums calculated in step 1106, that is, in descending order of the calculated total effect indices (the addition effect index or the deletion effect index in the data denoted by the reference numerals 1220 to 1222 in FIG. 12). Furthermore, in this control, the configuration determining device 1171 determines the above manner for controlling the execution multiplicity within the range having an upper limit defined by the quantity of resources that can be used, i.e., the number of resources (information processing apparatuses 132) (in this case, the total number of the information processing apparatuses 132 used for all the service objects 135 to 137 is five) (step 1108). The configuration determining device 1171 stores the determined contents into the memory 12C, etc.

For example, in the case of the temporary table 1200 shown in FIG. 12, the configuration determining device 1171 judges that it is most effective to add an information processing apparatus 132 that will execute a service object having the name of "AP_001". Then, where the maximum number of machines is five, the current number 502 of machines used is five. Therefore, in this case, the configuration determining device 1171 recognizes that an information processing apparatuses 132 that will execute the above service object cannot be added and such a manner for varying the execution multiplicity cannot be applied.

On the other hand, the addition effect index for a service object having the service name of "AP_001" in the data denoted by the reference numeral 1221 in FIG. 12 is "13.5", the deletion effect index for a service object having the service name of "WEB_001" denoted by the reference numeral 1220 is "−10.2", and the addition effect index of "13.5" for a service object having the service name of "AP_001" is greater than the deletion effect index of "−10.2" for the service object having the service name of "WEB_001" (the comparison being carried out on the absolute values of the indices). Hence, it is judged that the load balance over the whole distributed object system is improved when the multiplicity of "WEB_001", is decreased from three to two and the multiplicity of "AP_001" is increased from one to two over when the current configuration is maintained. Therefore, in this case, the configuration determining device 1171 determines the method for controlling the execution multiplicity to be such that that manner of varying the execution multiplicity is applied (step 1108).

<Processing by Resource Assigning Unit 1172>

Figure 13:
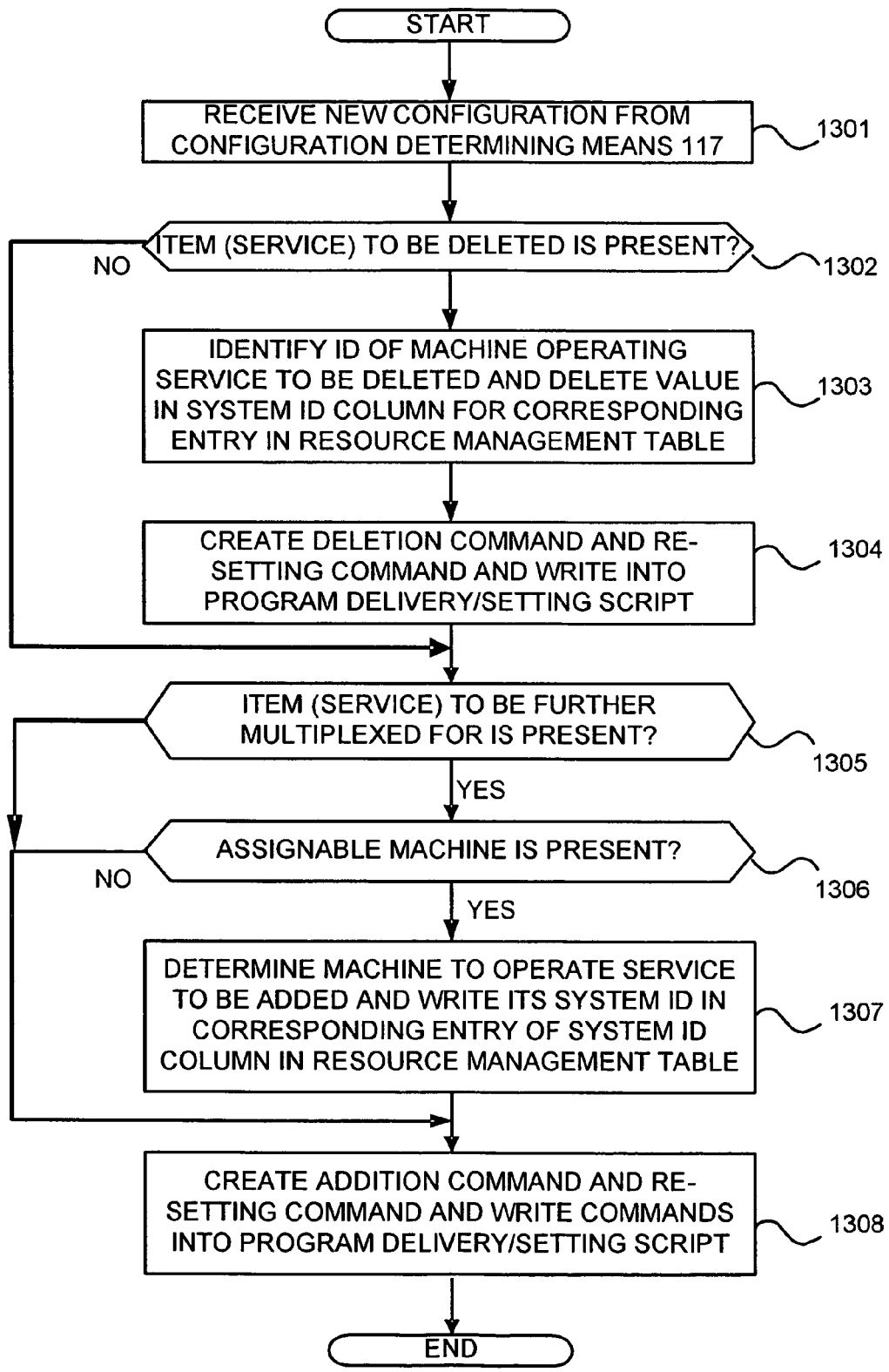
FIG. 13 is a flowchart describing the flow of a process carried out by a resource assigning unit 1172 to be described in the embodiment of the present invention.

According to the method for controlling the execution multiplicity determined by the configuration determining device 1171 as above, the resource assigning unit 1172 carries out the process for the control of the execution multiplicity of each of the service objects. FIG. 13 is a flowchart describing the flow of the process carried out by the resource assigning unit 1172.

The resource assigning unit 1172 obtains information describing the method for controlling the execution multiplicity determined by the configuration determining device 1171 (step 1301). The information describing the method for controlling the execution multiplicity includes, for example, information indicating the association between a service name and the machine ID of an information processing apparatus 132 in which the service object corresponding to the service name is executed.

Next, the resource assigning unit 1172 checks whether or not a service object having execution multiplicity to be decreased is present when the configuration is shifted from the current system configuration to a new system configuration corresponding to the method for controlling the execution multiplicity determined by the configuration determining device 1171 (step 1302). Here, if a service object having the execution multiplicity to be decreased is present, the resource assigning unit 1172 finds the machine ID of the information processing apparatus 132 in which the service object is operating, and deletes the content of the system ID column 602 corresponding to that machine ID in the resource management table 120 shown in FIG. 6 (step 1303).

Next, the resource assigning unit 1172 produces a deletion command for decreasing the execution multiplicity of the service object to the distributed object system 131 and writes the produced deletion command into the management domain of the script for program delivery/setting stored in the memory 12C (step 1304). FIG. 14 shows an example of the program delivery/setting script 1401. The detail of the function of the program delivery/setting script will be described later.

Next, in shifting from the current system configuration to the new system configuration, the resource assigning unit 1172 checks whether or not a service object having execution multiplicity to be increased is present (step 1305). If a service object having the execution multiplicity to be increased is present, the resource assigning unit 1172 further checks whether or not a resource (information processing apparatus 132) available for assigning is present (step 1306). Here, if a resource available for assigning is present, the resource assigning unit 1172 determines an information processing apparatus 132 to realize the service object having the execution multiplicity to be increased and writes the ID of the distributed object system 131 being currently processing, "SYS_001", to the position of the system ID column 602 corresponding to the machine ID of the information processing apparatus 132 present in the corresponding machine ID column 601 of the resource management table 120 (step 1307). Then, the resource assigning unit 1172 creates an additional command for the distributed object system 131 to increase the execution multiplicity of the service object and writes the created command into the program delivery/setting script 1401 (step 1308).

FIG. 14 shows an example of the program delivery/setting script 1401 created by the resource assigning unit 1172. In FIG. 14, the character string denoted by the reference numeral 1411 corresponds to a command (deletion command) for deleting the service object having the service name of "WEB_001" being executed by the information processing apparatus 132 having a machine ID of "M_004" in the distributed object system 131 having the system ID of "SYS_001". The character string denoted by the reference numeral 1412 corresponds to a command (re-setting command) for releasing (making a service object impossible to be invoked) the assignment setting to "WEB_001" (setting for enabling the service object to be invoked) in the distributed object system having the system ID of "SYS_001" from the current settings of the load balancer 133 having identification information set to be "LB_001". Furthermore, the character string denoted by the reference numeral 1413 corresponds to a command (addition command) for installing a program for realizing a service object having the service name of "DB_001" of the distributed object system 131 having the system ID of "SYS_001" in the information processing apparatus 132 having the machine ID of "M_004". The character string denoted by the reference numeral 1414 corresponds to a command (re-setting command) for adding an assignment setting to the service object having the service name of "DB_001" (setting for enabling the service object to be invoked) of the distributed object system 131 having the system ID of "SYS_001", to the setting contents of the naming service 134 with identification information of "NS_001".

<Delivery/Setting of Programs, etc.>

Figure 15:
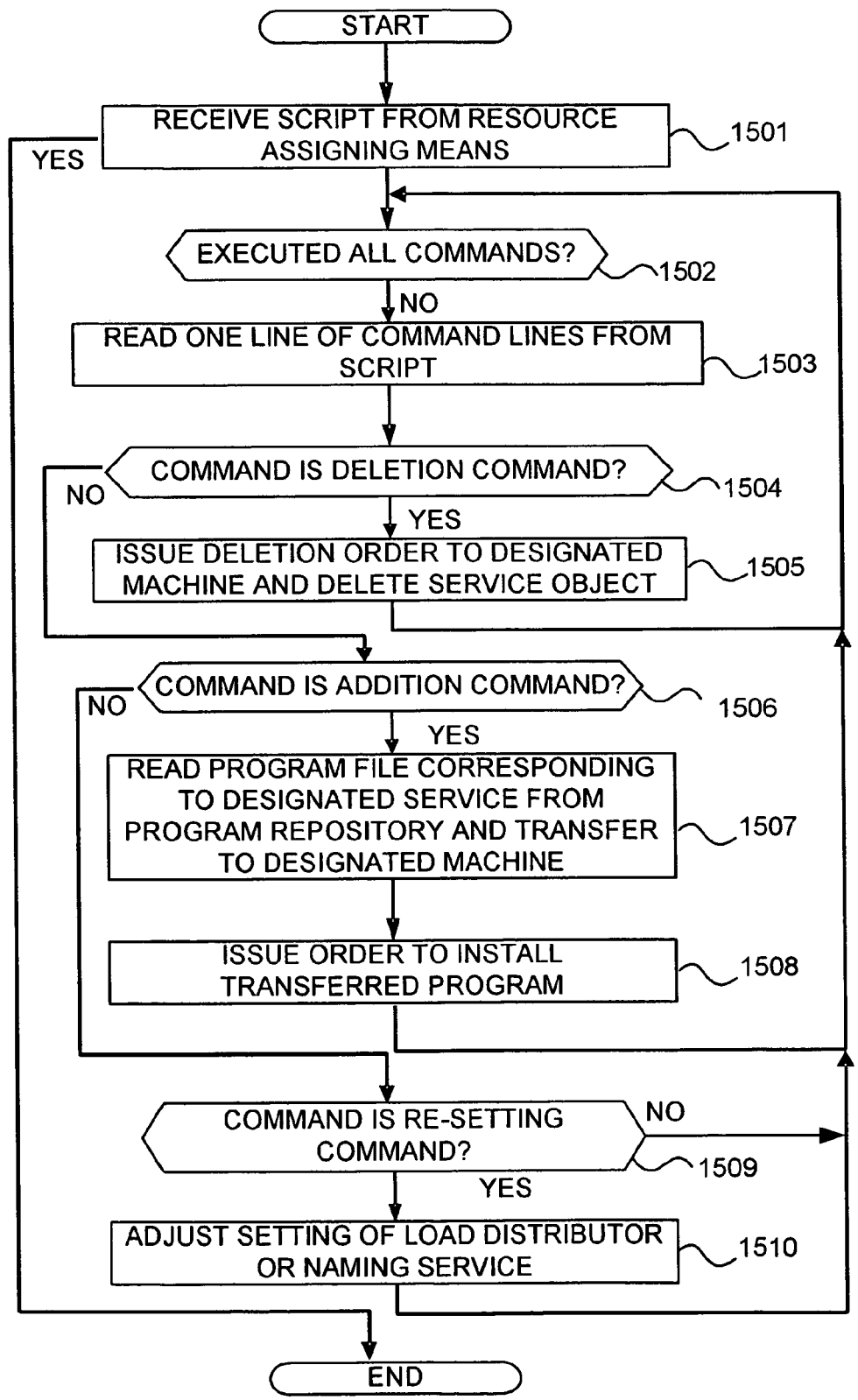
FIG. 15 shows a flowchart describing the flow of a process carried out by a program delivery/setting device 1173 to be described in the embodiment of the present invention.

Next, the program delivery/setting device 1173 executes the program delivery/setting script 1401 created by the resource assignment device 1172 and actually controls the execution multiplicity of the distributed object system 131 according to the method for controlling the execution multiplicity determined by the configuration determining device 1171. FIG. 15 is a flowchart describing the flow of the process carried out by the program delivery/setting device 1173 for controlling the execution multiplicity.

First, the program delivery/setting device 1173 obtains the delivery/setting script 1401 from the resource assignment device 1172 (step 1501).

Next, the program delivery/setting device 1173 processes the commands stated in the program delivery/setting script 1401 line byline. At step 1502, the program delivery/setting device 1173 judges whether or not all of the commands stated in the program delivery/setting script 1401 have been processed. At step 1503, the program delivery/setting device 1173 reads the commands one after another from the script 1401 (step 1503).

At step 1504, the program delivery/setting device 1173 judges whether or not the command read in step 1503 is a deletion command (step 1504). Here, if the read command is a deletion command (step 1504: YES), the program delivery/setting device 1173 transmits a deletion order to a designated resource (information processing apparatus 132) (step 1505). Thereafter, the process returns to step 1502. In step 1504, if the read command is not a deletion command (step 1504: NO), the process proceeds to step 1506.

At step 1506, the program delivery/setting device 1173 judges whether or not the command read in step 1505 is an addition command (step 1506). Here, if the read command is an addition command (step 1506:YES), the program delivery/setting device 1173 reads out the program file and data corresponding to the service name designated by the program repository 122 and transfers the read file and data to a designated resource (information processing apparatus 132) (step 1507). Furthermore, at this time, the program delivery/setting device 1173 transmits an order for the resource (the information processing apparatus 132) to execute an installation process for the transferred program file and the data (step 1508). Thereafter, the process returns to step 1502. In the judgment made in step 1506, if the command read in step 1505 is not a deletion command (step 1506:NO), the process proceeds to step 1509.

In the process of step 1509, the program delivery/setting device 1173 judges whether or not the command read in step 1505 is a re-setting command (step 1509). Here, if the read command is a re-setting command (step 1509:YES), the program delivery/setting device 1173 carries out the re-setting of the load balancer 133 or the naming service 134. If the read command is not a re-setting command (step 1509:NO), the process returns to step 1502.

As the method for delivering or deleting the program files and data necessary for realizing the service objects 135 to 137, other method than the method introduced above can be considered. For example, a method disclosed in the Japanese Patent Application Laid-open Publication No. 2001-175460 can be used.

As described above, according to the execution multiplicity control system 101 of the present invention, the execution multiplicity of the service objects 135 to 137 can be appropriately controlled in response to the load distribution and the request distribution. Furthermore, the control of the execution multiplicity can be carried out within the range with the upper limit defined depending on the quantity of resources available for the distributed object system to execute each of the service objects. Therefore, the load distribution can be appropriately realized without consuming resources wastefully. Furthermore, according to the execution multiplicity control system 101 of the present invention, the total load balance of the distributed object system 131 can be appropriately controlled because the execution multiplicity of the plurality of service objects 135 to 137 can be controlled in a comprehensive manner. Yet furthermore, the execution multiplicity of the service objects 135 to 137 can be appropriately controlled even at the startup because the load on each of the service objects constituting the distributed object system 131 is measured in advance for each case where one type of service requests are inputted into the distributed object system 131.

That is, according to the execution multiplicity control system 101 of the present invention, in a distributed object system realized including a plurality of service objects, load distribution can be carried out appropriately maintaining the load balance over the whole system without consuming the resources wastefully.

Embodiment 2

The basic configuration of an execution multiplicity control system 101 described in the present embodiment is the same as that of Embodiment 1. The execution multiplicity control system 101 described in the embodiment stores and accumulates obtained load distributions and request distributions, extracts a request distribution similar to the request distribution most recently acquired from the stored request distributions, and obtains the differences in execution state and load distribution between the latest service object and the service object stored associated with the extracted request distribution. Then, the execution multiplicity control system 101 calculates and stores for each service object an effect index (the total effect index) indicating the improvement effect of the processing efficiency of the distributed object system 131 for the case where the execution multiplicity of the service objects is varied, from the acquired differences in execution state and load distribution, and controls the execution multiplicity of the service objects constituting the distributed object system 131 by applying the above method for controlling the execution multiplicity to the service objects in descending order of the total effect indices.

According to the execution multiplicity control system 101 described in this embodiment, it is not necessary that providing a testing environment as described for Embodiment 1, measurement is made for each service request type one by one, and all processes necessary for the control of the execution multiplicity can be carried out during the practical operation of the distributed object system 131, etc.

Figure 17:
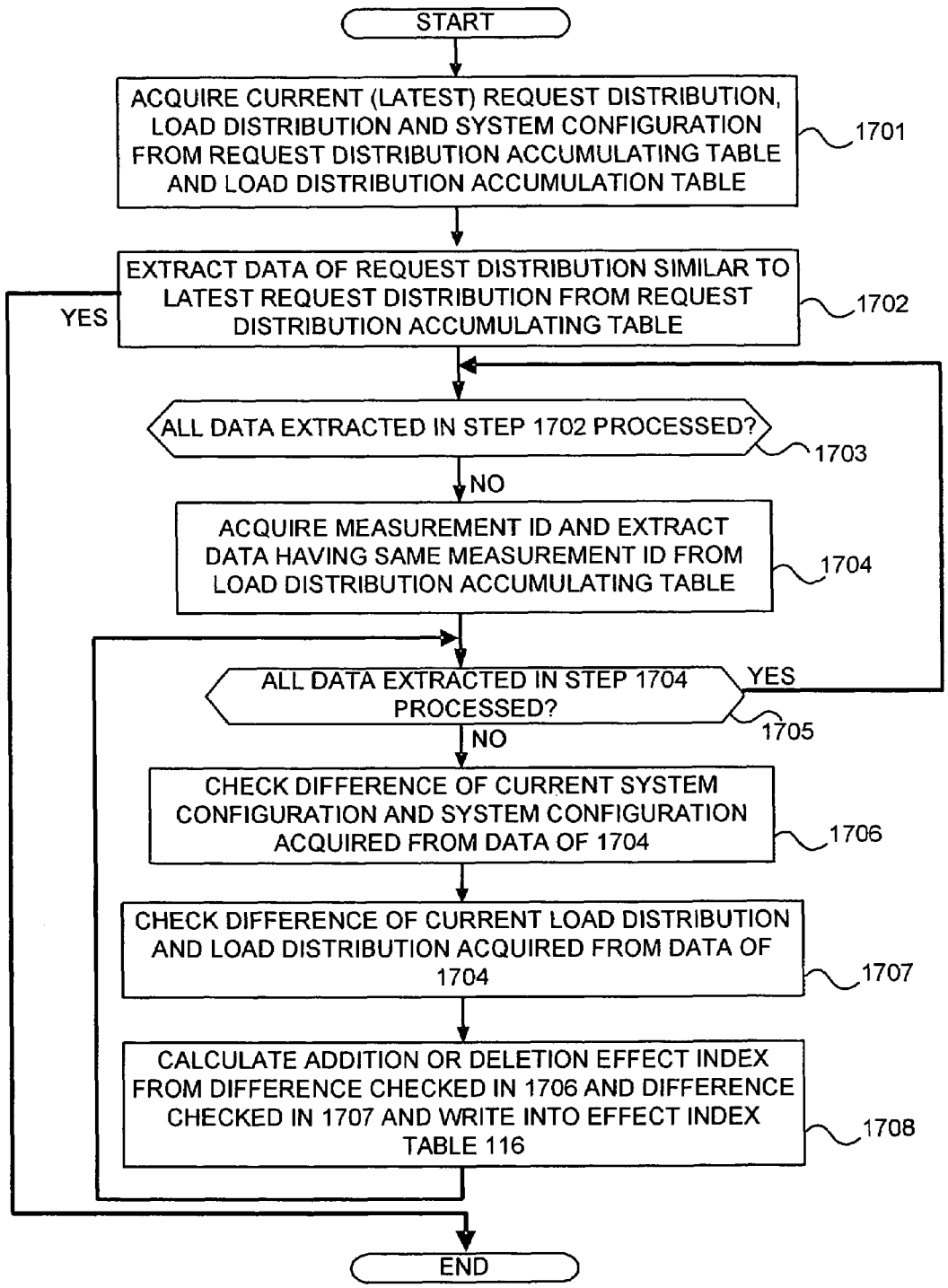
FIG. 17 shows a flowchart describing the flow of a process carried out by an effect index calculation unit (difference acquisition unit) 115 to be described in an embodiment of the present invention.

FIG. 17 is a flowchart describing the flow of the process carried out by the effect index calculation unit (difference acquisition unit) 115. First, the effect index calculation unit 115 obtains the latest request distribution, the latest load distribution and the latest system configuration from the request distribution accumulating table 114 and the load distribution accumulating table 112 (step 1701).

Next, the effect index calculation unit 115 extracts data of request distributions similar to the latest request distribution from the request distribution accumulating table 114 (step 1702).

At step 1702, the effect index calculation unit 115 extracts all similar request distributions. Here, the judgment of a similar request distribution can be carried out using a method in which, for example, the differences in the request rate between the same type of service requests are totaled and whether the difference is above a threshold value is judged. Also, similarity is calculated by applying a similarity calculation method in the cluster analysis technique using the request rate of each service request as a parameter, and whether it is similar can be judged according to the calculated similarity. In the embodiment, the latest request distribution is assumed to be the contents denoted by the reference numeral 316 in FIG. 3, that is, "42" for REQ_001, "19" for REQ_002, and "39" for REQ_003. The request distribution similar to this request distribution is assumed to be the request distribution denoted by the reference numeral 315 in FIG. 3: "140" for REQ_001, "21" for REQ_002 and "39" for REQ_003. That is, at step 1702, the data denoted by the reference numeral 315 is extracted as a similar request distribution.

At step 1703, the effect index calculation unit 115 judges whether or not the processes of steps 1704 to 1708 have been carried out on all the data extracted in step 1702.

Next, the effect index calculation unit 115 obtains a measurement ID from the data extracted in step 1702 and extracts data of the same measurement ID as the acquired measurement ID from the load distribution table 112 (step 1704). For example, because the measurement ID of the data denoted by the reference numeral 314 in FIG. 2 is "122", in this case, data denoted by the reference numeral 215 in FIG. 2 is extracted by the process in step 1704.

Next, the effect index calculation unit 115 refers to the latest load distribution acquired in step 1701 and the similar load distribution extracted in step 1704 and checks the difference in the system configuration (configuration to execute service objects) (step 1706). Here, from the fact that two data having the service name of "WEB_001" are included in the data denoted by the reference numeral 216 in the load distribution table 112 in FIG. 2, it can be seen that, in the current system configuration, the execution multiplicity of the service object having the service name of "WEB_001" is two. Similarly, it can also be seen that the execution multiplicity of the service object having the service name of "AP_001" is one and the execution multiplicity of the service object having the service name of "DB_001" is one. Furthermore, for the extracted past system configuration, from the data denoted by the reference numeral 215 in the load distribution accumulating table 112 in FIG. 2, it can be seen that the execution multiplicity of the service object having the service name of "WEB_001" is one, the execution multiplicity of the service object having the service name of "AP_001" is one and the execution multiplicity of the service object having the service name of "DB_001" is one. Therefore, in this case, the effect index calculation unit 115 judges that the multiplicity differs by one for "WEB_001" as the difference in the system configuration.

Next, the effect index calculation unit 115 refers to the current load distribution acquired in step 1701 and the similar load distribution extracted in step 1704 and checks the difference in the load distribution (step 1707). Here, referring to the data (the current load distribution) denoted by the reference numeral 216 in the load distribution accumulating table 112 in FIG. 2, the load distribution of a service object having the service name of "WEB_001" is "30", the load distribution of a service object having the service name of "AP_001" is "28" and the load distribution of a service object having the service name of "DB_001" is "11". Moreover, looking at the data (the past load distribution) denoted by the reference numeral 215 in the figure, the load distribution of a service object having the service name of "WEB_001" is "61", the load distribution of a service object having the service name of "AP_001", is "27", and the load distribution of a service object having the service name of "DB_001", is "12". Thus, the effect index calculation unit 115 calculates the difference in the load distribution to be "61−30=31", for the service object having the service name of "WEB_001", "27−28=−1" for the service object having the service name of "AP_001" and "12−11=1" for the service object having the service name of "DB_001".

Here, as described above, the addition effect index in the effect index table 116 is a value indicating how much effect is obtained when the multiplicity of a service object is increased by one. Then, from the above result, the effect index calculation unit 115 determines the addition effect index of the service object having the service name of "WEB_001", to be "31" and writes this addition effect index into the effect index table 116 (step 1708). For the service objects having the service name of "AP_001" and "DB_001", the addition effect indices for these service objects are similarly written into the effect index table 116 by the effect index calculation unit 115. The addition effect indices for the service objects having the service name of "AP_001" and "DB_001" are small, respectively "1" and "−1". Hence, these addition effect indices can be handled as being "zero".

In Embodiment 1, in creating the temporary table 1200 in FIG. 12, after calculating the addition effect indices and deletion effect indices for each request distribution, the addition effect indices and deletion effect indices calculated for each request distribution are totaled. In contrast, in the embodiment, the contents of the service name column 403, addition effect index column 404 and deletion effect index column 405 in the effect index table 116 are used as the contents of the service name column 1201, addition effect index column 1203 and deletion effect index column 1204 in the temporary table 1200 in FIG. 12. Therefore, in the embodiment, steps 1102 to 1105 in the flowchart by the configuration determining device 1171 in FIG. 11 described for Embodiment 1 are not necessary and, by that amount, the process is simplified and the process load is reduced.

Embodiment 3

Depending on the type of the distributed object system 131, similar request distributions may repeatedly appear at a constant cycle. For example, in an on-line-based business operation system, usually, a large amount of transaction occurs during the business hours. However, the amount of the transaction is reduced during the time period such as night time. The execution multiplicity control system 101 described in the embodiment predicts the request distribution in a time period in the future based on the data registered in the request distribution accumulating table 114 and controls the execution multiplicity of the service objects 135 to 137 constituting the distributed object system 131 based on the prediction. The process except the prediction of the execution multiplicity control system 101 in the embodiment is carried out similarly as in the Embodiment 1 and the Embodiment 2 described above.

FIG. 18 shows a request distribution predicting table 1801 stored in the execution multiplicity control system 101 of the embodiment. The request distribution predicting table 1801 is provided with a system ID column 1811 in which system IDs are set, a service request name column 1812 in which service request names are set, a time period column 1813 in which time periods are set and a number-of-service-requests column 1814 in which the number of service requests are sets.

The request information acquisition unit 113 in the execution multiplicity control system 101 of the embodiment, as a part of its process, counts the number of service requests for each service request name for each time period and writes the result of the counting into the request distribution predicting table 1801 (registering and recording).

In determining the method for controlling the execution multiplicity, the configuration determining device 1171 obtains the current time from the system clock of the information processing apparatuses 132 realizing the execution multiplicity control system 101 and calculates effective indices in a time period in the future based on the past request distribution in the corresponding time period after the current time registered in the request distribution predicting table 1801. Then, the same process as in Embodiment 1 or Embodiment 2 is carried out based on the calculated effect indices. Thereby, the method for controlling the execution multiplicity is determined. This mechanism can be realized by, for example, substituting the process of step 1101 in the process of FIG. 11 by the configuration determining device 1171 with the above process.

According to the execution multiplicity control system 101 in the embodiment, for the distributed object system 131 having a nature that the distribution of the number of service requests appears repeatedly at a constant cycle, effect indices in time periods in the future can be calculated based on the past distributions of the numbers of service requests stored accumulated by the request information acquisition unit. That is, effective indices in a time period in the future can be predicted based on the past data.

Embodiment 4

The execution multiplicity control system 101 that will be described in the embodiment accepts request distribution from a user interface such as the input apparatus 14C and determines a method for controlling the execution multiplicity based on the accepted request distribution. The process in the execution multiplicity control system 101 of the embodiment except the process for accepting the request distribution from a user interface such as the input apparatus 14C is carried out similarly as in Embodiment 1 and Embodiment 2, for example.

In, for example, operating an on-line book center during night time, the execution multiplicity of the service object for the business of the book store may be desired to be decreased and, in contrast, the execution multiplicity of the service object for the processes such as totaling of the sales data may be desired to be increased. Here, assuming the service request name of search for books to be "REQ_001", the service request name of ordering of books to be "REQ_002" and the service request name of the process for totaling the sales data to be "REQ_003", a user inputs a request distribution for which the request rate of "REQ_003" is intentionally increased, from a user interface to the execution multiplicity control system 101. The execution multiplicity control system 101 accepts the above request distribution and gives the accepted request distribution to the configuration determining device 1171. The configuration determining device 1171 determines the method for controlling the execution multiplicity based on this request distribution. The mechanism in the embodiment can be realized by, for example, reading in the above desired request distribution instead of acquiring the latest request distribution from the request distribution accumulating table 114 in step 1101 in the flowchart by the configuration determining device 1171 in FIG. 11.

According to the execution multiplicity controlling system 101 of the embodiment, meticulous control responding to the individual needs of a user can be carried out in terms of the control of the execution multiplicity of the service objects 135 to 137.

The embodiments of the present invention have been described hereinabove. It is, however, to be appreciated that the above description of the embodiments is merely to facilitate the understanding of the present invention and does by no means limit the present invention. The present invention may be varied or modified without departing from the sprit thereof, and in addition, it should be understood that the present invention encompasses the equivalents thereof.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An execution multiplicity control system dynamically controlling execution multiplicity of a plurality of service objects in a distributed object system including service objects that are implemented by execution of a program by a CPU, the execution multiplicity control system comprising:
   at least one computer;
   a load information acquisition unit, implemented by execution of a program by the computer, that measures a load on each of the service objects forming the distributed object system for each case when one type of service requests are inputted into the distributed object system, and, based on the measured loads, acquires and stores a load distribution over the service objects forming the distributed object system;
   an effect index calculation unit that calculates and stores an effect index which is an index indicating a processing efficiency improvement for when the execution multiplicity of each of the service objects is varied based on the load distribution;
   a request information acquisition unit that measures, for each type of the service requests, a number of service requests inputted into the distributed object system, acquires a request distribution that is a distribution of the service requests based on the measured number of the service requests, and stores the acquired request distribution;
   a total-effect index calculation unit that calculates and stores a total-effect index comprising processing efficiency improvement values of the distributed object system for when the execution multiplicity of each of the service objects is varied based on the effect index and the request distribution; and
   an execution multiplicity control unit that increases or decreases the execution multiplicity of a plurality of the service objects in the distributed object system based on the total-effect index such that the execution multiplicity of the service objects is increased or decreased in a descending order of absolute values of the processing efficiency improvement values.

2. An execution multiplicity control system according to claim 1, wherein
   the execution multiplicity control unit stores a quantity of resources available for the distributed object system to execute each of the service objects, and wherein
   the execution multiplicity control unit varies the execution multiplicity of each of the service objects within a range having an upper limit defined according to the quantity of the resources available.

3. An execution multiplicity control system according to claim 2, wherein the quantity of the resources comprises a number of information processing apparatuses available for implementing the distributed object system.

4. An execution multiplicity control system according to claim 1, wherein
   the distributed object system has a naming service that is an object which stores an identification information piece of each service object and a position information piece indicating the position where a program to implement the service object is stored so as to be associated with each other, and which in response to an inquiry request transmitted from a service object, responds to the service object by transmitting the position information piece that is associated with an identification information piece attached to the inquiry request, wherein
   the naming service stores a plurality of the position information pieces for each identification information piece, and multiplexes processes of a service object by responding to the service object with a different one of the position information pieces in response to each of two or more inquiry requests having the same identification information piece attached, and wherein
   the execution multiplicity control unit varies the multiplicity by varying the number of the position information pieces stored associated with the identification information piece by the naming service.

5. An execution multiplicity control system according to claim 1, wherein
   the request information acquisition unit stores accumulatively the request distribution for each time period, and wherein
   the total effect index calculation unit calculates the total effect index in a future time period based on a past request distribution for the corresponding time period after a current time.

6. An execution multiplicity control system according to claim 1, wherein the request information acquisition unit accepts the request distribution from a user interface.

7. An execution multiplicity control system according to claim 1, wherein
   the distributed object system is a Web three-layered system, and wherein each of the service objects is an object that implements a function corresponding to one layer in the Web three-layered system.

8. An execution multiplicity control system dynamically controlling execution multiplicity of a plurality of service objects in a distributed object system including service objects that are implemented by execution of a program by a CPU, the execution multiplicity control system comprising:

at least one computer;

a load information acquisition unit, implemented by execution of a program by the computer, that measures a load on each of the service objects forming the distributed object system, acquires a load distribution of the service objects forming the distributed object system based on the measured loads, and stores the acquired load distribution accumulatively;

a request information acquisition unit that measures, for each type of service requests, a number of service requests inputted into the distributed object system, acquires a request distribution that is a distribution of the service requests based on the measured numbers of service requests and stores the acquired request distribution accumulatively so as to be associated with an execution state of the service objects in the measurement;

a difference acquisition unit that extracts a request distribution similar to a most recently acquired request distribution from the request distributions stored in the request information acquisition unit, and acquires differences in control states of execution multiplicity and load distribution of the service objects between at a time specified by a stored execution state associated with the extracted request distribution and a most recent time;

a total-effect index calculation unit that calculates and stores a total-effect index comprising processing efficiency improvement values of the distributed object system for when the execution multiplicity of each of the service objects is varied, based on the differences in control states of the execution multiplicity and load distribution of the service object; and an execution multiplicity control unit that increases or decreases the execution multiplicity of a plurality of the service objects in the distributed object system based on the total-effect index such that the execution multiplicity of the service objects is increased or decreased in a descending order of absolute values of the processing efficiency improvement values.

9. The execution multiplicity control system of claim 1 or 8, wherein the effect index comprises an addition effect value for service objects determined as (load rate/current multiplicity)−(load rate/(current multiplicity +1)), or a deletion effect value for service objects determined as (load rate/(current multiplicity +1))−(load rate/current multiplicity).

10. The execution multiplicity control system of claim 9, wherein the processing efficiency improvement values comprise a product of the request distribution and the addition effect value or a product of the request distribution and the deletion effect value.

11. A computer-readable storage medium encoded with a computer program comprising instructions which, when executed by a processor, implement an execution multiplicity control system for dynamically controlling execution multiplicity of a plurality of service objects in a distributed object system, the instructions configured to cause the processor to perform steps of:

measuring a load on each of the service objects forming the distributed object system for each case when one type of service requests are inputted into the distributed object system, and, based on the measured loads, acquiring and storing a load distribution over the service objects forming the distributed object system;

calculating and storing an effect index which is an index indicating a processing efficiency improvement for when the execution multiplicity of each of the service objects is varied based on the load distribution;

measuring, for each type of the service requests, a number of service requests inputted into the distributed object system, acquiring a request distribution that is a distribution of the service requests based on the measured number of the service requests, and storing the acquired request distribution;

calculating and storing a total-effect index comprising processing efficiency improvement values of the distributed object system for when the execution multiplicity of each of the service objects is varied, based on the effect index and the request distribution; and increasing or decreasing the execution multiplicity of a plurality of the service objects in the distributed object system based on the total-effect index such that the execution multiplicity of the service objects is increased or decreased in a descending order of absolute values of the processing efficiency improvement values.

12. A computer-readable storage medium encoded with a computer program comprising instructions which, when executed by a processor, implement an execution multiplicity control system for dynamically controlling execution multiplicity of a plurality of service objects in a distributed object system, the instructions configured to cause the processor to perform steps of:

measuring a load on each of the service objects forming the distributed object system, acquiring a load distribution of the service objects forming the distributed object system based on the measured loads, and storing the acquired load distribution accumulatively;

measuring, for each type of service request, a number of service requests inputted into the distributed object system, acquiring a request distribution that is a distribution of the service requests based on the measured numbers of the service requests, and storing the acquired request distribution accumulatively so as to be associated with an execution state of the service objects measured;

extracting a request distribution similar to a most recently acquired request distribution from request distributions stored in a request information acquisition unit, and acquiring differences in control states of execution multiplicity and load distribution of the service objects between a time specified by the execution state stored with the extracted request distribution and a most recent time;

calculating and storing a total-effect index comprising processing efficiency improvement values for when the execution multiplicity of each of the service objects is varied, based on the differences in control states of execution multiplicity and load distribution of the service objects; and increasing or decreasing the execution multiplicity of a plurality of the service objects in the distributed object system based on the total-effect index such that the execution multiplicity of the service objects is increased or decreased in a descending order of absolute values of the processing efficiency improvement values.

13. The computer-readable storage medium of claim 11 or 12, wherein the effect index comprises an addition effect value for service objects determined as (load rate/current multiplicity)−(load rate/(current multiplicity +1)), or a deletion effect value for service objects determined as (load rate/(current multiplicity +1))−(load rate/current multiplicity).

14. The computer-readable storage medium of claim 13, wherein the processing efficiency improvement values comprise a product of the request distribution and the addition effect value or a product of the request distribution and the deletion effect value.

15. A computer-readable storage medium encoded with a computer program comprising instructions which, when executed by a processor, implement an execution multiplicity control system for dynamically controlling execution multiplicity of a plurality of service objects in a distributed object system, the instructions configured to cause the processor to perform steps of:
measuring a load on each of the service objects forming the distributed object system for each type of service request inputted into the distributed object system, and, based on the measured loads, acquiring and storing a load distribution over the service objects forming the distributed object system;
calculating and storing an effect index which is an index indicating a processing efficiency improvement for when the execution multiplicity of each of the service objects is varied based on the load distribution;
measuring, for each type of the service request, a number of service requests inputted into the distributed object system, acquiring a request distribution that is a distribution of the service requests based on the measured number of the service requests, and storing the acquired request distribution;
calculating and storing a total-effect index comprising processing efficiency improvement values of the distributed object system for when the execution multiplicity of each of the service objects is varied based on the effect index and the request distribution; and
increasing or decreasing the execution multiplicity of a plurality of the service objects in the distributed object system based on the total-effect index such that the execution multiplicity of the service objects is increased or decreased in a descending order of absolute values of the processing efficiency improvement values.

16. A computer-readable storage medium encoded with a computer program comprising instructions which, when executed by processor, implement an execution multiplicity control system for dynamically controlling execution multiplicity of a plurality of service objects in a distributed object system including service objects, the instructions configured to cause the processor to perform steps of:
measuring a load on each of the service objects forming the distributed object system, acquiring a load distribution of the service objects forming the distributed object system based on the measured loads, and storing the acquired load distribution accumulatively;
measuring, for each type of service request, a number of service requests inputted into the distributed object system, acquiring a request distribution that is a distribution of the service requests based on the measured numbers of the service requests, and storing the acquired request distribution accumulatively so as to be associated with an execution state of the service objects measured;
extracting a request distribution similar to a most recently acquired request distribution from request distributions stored in a request information acquisition unit, and acquiring differences in control states of execution multiplicity and load distribution of the service objects between a time specified by the execution state stored with the extracted request distribution and a most recent time;
calculating and storing a total-effect index comprising processing efficiency improvement values for when the execution multiplicity of each of the service objects is varied based on the differences in the control states of execution multiplicity and load distribution of the service objects; and
increasing or decreasing the execution multiplicity of a plurality of the service objects in the distributed object system based on the total-effect index such that the execution multiplicity of the service objects is increased or decreased in a descending order of absolute values of the processing efficiency improvement values.

17. The computer-readable storage medium of claim 15 or 16, wherein the effect index comprises an addition effect value for service objects determined as (load rate/current multiplicity)−(load rate/(current multiplicity +1)), or a deletion effect value for service objects determined as (load rate/(current multiplicity +1))−(load rate/current multiplicity).

18. The computer-readable storage medium of claim 17, wherein the processing efficiency improvement values comprise a product of the request distribution and the addition effect value or a product of the request distribution and the deletion effect value.

* * * * *